United States Patent [19]

Tsukamoto et al.

[11] Patent Number: 5,747,775

[45] Date of Patent: May 5, 1998

[54] HIGH SPEED OVEN

[75] Inventors: Hideki Tsukamoto; Akio Ueoka; Hiroshi Matsuo, all of Tokyo, Japan

[73] Assignee: Fujimak Corporation, Tokyo, Japan

[21] Appl. No.: 436,453

[22] PCT Filed: Oct. 13, 1994

[86] PCT No.: PCT/JP94/01710

§ 371 Date: May 22, 1995

§ 102(e) Date: May 22, 1995

[87] PCT Pub. No.: WO95/10788

PCT Pub. Date: Apr. 20, 1995

[30] Foreign Application Priority Data

| Oct. 14, 1993 | [JP] | Japan | 5-055564 U |
| Oct. 14, 1993 | [JP] | Japan | 5-055630 U |
| Oct. 14, 1993 | [JP] | Japan | 5-256726 |
| Oct. 14, 1993 | [JP] | Japan | 5-256727 |
| Oct. 14, 1993 | [JP] | Japan | 5-257258 |
| Sep. 5, 1994 | [JP] | Japan | 6-210961 |

[51] Int. Cl.⁶ .................................................. F24L 15/36
[52] U.S. Cl. ........................ 219/400; 99/476; 200/43.19; 200/333
[58] Field of Search ...................... 219/400; 200/43.01, 200/43.02, 43.19, 333; 126/21 A; 99/474–476

[56] References Cited

U.S. PATENT DOCUMENTS

| 3,745,750 | 7/1973 | Arff | 96/16 |
| 3,884,213 | 5/1975 | Smith | 219/400 |
| 4,489,647 | 12/1984 | Stamps et al. | 99/336 |
| 5,133,044 | 7/1992 | Chiu | 392/405 |

FOREIGN PATENT DOCUMENTS

| 49-129241 | 12/1974 | Japan. |
| 50-132752 | 10/1975 | Japan. |
| 52-9147 | 1/1977 | Japan. |
| 52-136259 | 10/1977 | Japan. |
| 53-128464 | 10/1978 | Japan. |
| 55-22094 | 2/1980 | Japan. |
| 55-106024 | 7/1980 | Japan. |
| 56-138622 | 10/1981 | Japan. |
| 61-24820 | 9/1984 | Japan. |
| 63-34427 | 2/1988 | Japan. |
| 63-210534 | 9/1988 | Japan. |
| 63-263326 | 10/1988 | Japan. |

Primary Examiner—Teresa J. Walberg
Assistant Examiner—J. Pelham
Attorney, Agent, or Firm—Evenson, McKeown, Edwards & Lenahan, PLLC

[57] ABSTRACT

A heating apparatus of the present invention relates to a high speed oven having a turntable mechanism for heating food products by utilizing a combination of jet impingement of heated air (a jet impingement) and microwaves or either of them, the apparatus comprising a safety device and an exhaust device. This invention has the following configurations: a turntable mechanism for enabling the turntable to be preferably rotated, the turntable including openings at the central part thereof so that the heated air and microwaves can pass therethrough; a limiter mechanism for removing overload imposed on the turntable by utilizing only a mechanical operation; an apparatus provided with scarfed areas on upper and lower boards of the heating chamber so that the food products can be baked uniformly even when utilizing a jet impingement technique; a fan guard comprising a switch activation means for activating a switch for allowing a generation of the heated air, which switch is positioned at the outside of the heating chamber, only when the fan guard is fixed to the heating chamber; a heating apparatus which simplifies operations for connecting exhaust tubes upon a number of apparatuses being stacked on each other; and a turntable driving mechanism for preventing contaminants from flowing into a gap between a connecting shaft and an axis receptor.

3 Claims, 23 Drawing Sheets

HIGH SPEED OVEN

BACKGROUND OF THE INVENTION

The present invention relates to a heating apparatus, and more particularly to a high speed oven having a turntable mechanism, for heating food products to be cooked by utilizing a combination of impingement of heated air (a jet impingement) and microwaves or either of them, the heating apparatus comprising a safety device and an exhaust system.

DESCRIPTION OF THE PRIOR ART

Though attempts have been made in the past to improve the cooking oven, there still remains a lot of problems to be solved. Regarding the cooking oven, in particular one for use both in business and in homes, there has been a strong demand for a cooking apparatus which enables the time needed for cooking to be shortened and maintains and improves delicate cooking qualities of baked products, such as temperature, baking color, flavor, smell, and so on.

A microwave oven utilizing inductive heating generated by a microwave can raise the temperature inside the food products in a short time, so that the time needed for cooking can be shortened. However, the cooking qualities, such as finish, baking color, flavor, and smell of the food products are not good. Accordingly, the microwave oven may, in practice, be regularly used for re-heating and thawing of the food products, but only rarely used for the final cooking stage of the baked products.

To overcome the above drawback in the microwave oven, there is an oven in which inside heating and surface heating are combined, that is, while the inside of the food is heated with microwaves, its surface is heated by air convection at a high temperature and radiation of infrared rays, the oven further comprising a turntable mechanism on which the food product can be mounted, so that it can be heated more uniformly. However, the balance of the cooking finish of the food product may be lost, because the velocity needed to accomplish the inside heating with microwaves is slower than that needed to accomplish the surface heating. As a result, if a heating velocity is adjusted to the cooking finish for the surface heating, the inside of the food will be heated too much, and thus the food may be too tough and savory water and juice will be removed from the food. As a result, the time needed for cooking will not be shortened very much. On the other hand, if the heating velocity is adjusted to the time needed for raising the temperature of the inside of food product, all of the surface may not be sufficiently heated. Thus, although the cooking time can be made shorter, the quality of the food can not be maintained.

To solve these above problems, Mr. Donald Paul Smith, an American, invented an apparatus in which air at a high temperature is ejected from a plurality of small holes separated from each other to impinge the air onto the upper and lower surfaces of the food product, so that the surfaces can be heated at a rate two or four times faster than a conventionally used forced convection heat transfer apparatus, it being possible for the apparatus to utilize microwaves for the inside heating of the food product (U.S. Pat. No. 3,884, 213). The heating principle and method invented by Mr. Smith are very effective, enabling the time needed for cooking to be shortened and cooking quality to be improved. However, such an apparatus having, in practice, the above benefits has not yet appeared in the market.

The reason for this is as follows. Although the above apparatus can be used as an apparatus for all baking dishes for all the dry-types of heating, such as baking, boiling, barbecuing, griddling, roasting, and fry cooking not using oil, oils and juices might be dispersed in the oven at the time of cooking depending on the kind of cooking method and the food product to be cooked. As a result, these oils and juices would be baked, carbonized and finally accumulated on wall surfaces and many portions in the oven due to the high temperature. This would cause many troubles, for example, a locking of the removable portions in the oven and a local heating resulting from a generation of microwave sparks. Accordingly, the level of the cleaning performance on the inside of the oven is very important for the above type of oven. However, even if the cleaning performance of the apparatus is improved, providing of such elements as the jet impingement mechanism, a microwave mechanism and a turntable makes the structure of the apparatus complicated, thus making the cleaning performance ineffective. Accordingly, such an apparatus as that of the present invention has been desired.

In almost all of the prior ovens each comprising a turntable, a driving device is mounted on the backside of the bottom surface of the heating chamber, the axis of which device penetrates the bottom surface of the heating chamber. In such apparatuses as above constructed, since the driving device might be immersed into oil and cleaning fluid via its axis receptor, significant disadvantages, such as a sufficient cleaning operation of the apparatus utilizing water and a chemical cleaning agent is made impossible; the axis is caused to be locked; and a failure in the driving device is made to occur, would be caused. To overcome these problems, it has been desired that a method and an apparatus as used in the present invention be provided, in which method, the driving device for the turntable is not positioned at the bottom surface of the heating chamber, and which apparatus can be disassembled for ordinary cleaning and operates perfectly.

A most typical turntable has an entirely flat form, and is supported by a rotational axis at the center thereof. The turntable itself has a latticed construction so that the food products can be effectively impinged on by the jet of heated air and microwaves. However, the area around the center of the turntable cannot be sufficiently heated due to the lack of the heating by the impingement of the heated air jet and the microwaves.

Accordingly, there has been provided a prior art apparatus having a heating mechanism made more effective due to its improved turntable mechanism, in which apparatus, for example, a turntable has an opening at the central part thereof and is supported by four roller legs. These legs are positioned at periphery portions of the turntable. In such a structure, the problem of the previously mentioned prior art has been overcome by means of supporting the turntable at the periphery portions thereof, so that the heated air and microwaves can impinge on the area about the center of the turntable. In such a structure, however, since the rotation of the turntable is allowed by means of the engagement between the supporting rollers and the outer periphery of the turntable, a new problem might arise when the engagement is made ineffective by imposing an eccentric load on the turntable, thereby causing a failure of the engagement. Thus, another new problem, namely, the turntable cannot rotate smoothly, arises. Accordingly, it is desirable to provide a structure whose heating mechanism has been improved, without, as a result, the turntable rotation being hindered.

In connection with the rotation of the turntable, it is necessary to consider the overloading problem caused at the time the turntable rotates. Since the turntable is constructed to be rotated by rotation torque transmitted to the turntable, which torque is generated by a motor positioned at the outside of the oven, it sometimes happens that large overload is applied to the driving motor due to a locking of the rotating axis which is caused by contaminants attached to the axis, or an obstruction to the turntable rotation which is caused by contaminants interposed between the turntable and, for instance, an inside wall of the oven, such an interposition being possibly caused by, for example, any incorrect management. There is a method of stopping the motor as a way to protect the driving motor from having such an overload applied thereto, in which method an electric current value (electric signals) in the motor is detected or an increase in the temperature in the motor is detected, so as to stop the motor when it is overloaded. However, if the motor is a relatively small one, such detections might be often difficult to accomplish. Thus, there is a need to provide a mechanical torque limiter mechanism, a further need that such a mechanism be smaller and more precise in function than the torque limiter mechanism in the prior art, and lastly that it not require any maintenance.

The heating mechanism of the turntable can be improved by utilizing the jet impingement technique. In the jet impingement technique, the heating operation (heat transmission) can be performed in a shorter time and more effectively than that of the prior art, since the heated air is impinged at a high speed on the objects to be heated. Also, it takes only a short time to properly color the surfaces of such objects by baking. However, since the heat conductivity of the impinged jet of the heated air is very large, the magnitude of the heat conductivity in the parts of the food on which the jet of the heated air is impinged may vary depending on the jet speed at each of the ejector pores of the jet (correctly referred to as "Reynolds numbers"), where the greater the jet speed is, the greater the heat conductivity is. Accordingly, when the jet impingement technique is utilized, the difference between the parts of the food well heated and the parts not well heated is increased, compared with the typically used heating method. Thus, unevennees in the "baking finishing" is caused to the food product to be heated, when parts of the food are well heated and others are not well heated, and when there are differences in the velocities of the jet speeds. Thus, it is required to make the flow speed at each of the ejector pores of the jet the same and effective, so as to give a beautiful appearance to the baked food without unevenness due to the baking.

In a prior method, a duct is provided in the oven, the duct having a width tapered from its upper side to lower side in a direction along the air flow, and being provided with a plurality of ejectors on one side of the upper surface and one side of the lower surface of the duct. However, such a structure makes the structure of the apparatus complicated, and thus the cleaning operation is not easy. Thus, it has been desired to provide a more simplified structure, having a smaller number of components, thus making the cleaning operation easy, and making the jet speed of the heated air uniform.

In addition to function problems, a safety problem may arise in the oven. Since the fan and the heater are often disposed in the interior of the heating chamber, it is required to prevent the user from injuring his fingers by touching the rotating fan and the heater when he puts materials to be heated, such as food, into the oven or take it out therefrom.

In the prior apparatus, an apparatus has been provided comprising a structure which activates a door switch (a micro switch is typically used) when the door is opened by the users, so that the rotation of the fan motor can be stopped. If such an apparatus is used for an apparatus whose door is very frequently opened and closed, in particular, when it is used for the purpose of obtaining quick service, the fan of such an apparatus may be frequently stopped, thus causing problems in performance, function, and durability. A fan guard is typically provided in front of the fan and the heater, so as to prevent the user from touching them. In this case, it is desirable to make it possible to remove the fan guard from the heating chamber, so that the cleaning performance can be improved, and also the fan guard can be taken out from the heating chamber at the time of cleaning. In an oven also utilizing microwave heating, the fan guard is often adapted to function as a shield board against microwaves. In this situation, since it is not easy to remove such a fan guard, and thus the cleaning performance is not always good, it has been desired to improve the oven by adapting a part other than the fan guard to have it a function as a shield board, so that the fan guard can be removed from the heating chamber for baking using a strong flame.

However, when the fan guard is made removable, it sometimes happens that the oven will be used under such a condition that it is forgotten to reset the fan guard in the heating chamber after its cleaning operation is finished. Thus, there is a possibility that the fan will be activated without re-setting the fan guard, and as a result, the user might be injured by the rotating fan and the heater when his fingers are inserted into the heating chamber. Also, there is a possibility that the fan and heater may be activated in error, while an operation for resetting the cleaned fan guard in the heating chamber is being performed. Thus, it has been desired to provide the fan guard which is not only removable from the apparatus, but prevents the user from forgetting to reset the fan guard.

The efficient utilization of space is an important subject which not effects more than just the heating apparatus. In the prior art, for instance, there is an apparatus having an exhaust tube for exhausting various gases, such as water, smoke, and so on, to the outside of the heating chamber, the gases being generated in the heating chamber at the time of cooking the food in the heating chamber of the oven. The apparatus of this type is provided with a door at the front side of the exterior cladding of the body, the food being put into the heating chamber or taken out therefrom when the door is open. The apparatus of this type is further adapted to have exhaust tubes and so on, which protrude from the interior of the heating chamber to the rear side of the back board of the exterior cladding, so the gases in the heating chamber are exhausted to the outside thereof. Thus, in the prior apparatus of this type, the exhaust tube is protruded from the back board of the exterior cladding to the rear side of the heating apparatus, the heating apparatus is limited to being put in a place separated from the backside wall of the oven by a predetermined distance when it is used.

When this apparatus is used in business, the cost performance can be significantly improved, since this apparatus makes it easy to realize a system of many apparatuses put in one place rather than putting one apparatus in one place, which system can respond to successive cooking orders just-in-time. In this case, to effectively utilize space and labor, the heating apparatuses are often stacked upon one another. Therefore, there is a need to connect the exhaust tubes of the heating apparatuses together, in such a way that the exhaust tube in a lower part of the stack and one in an upper part of the stack do not overlap one another, at the outside of the heating apparatuses. This worsens the external appearance of the apparatus; makes it necessary to place a heat barrier around the exhaust tubes and to provide safeguards; and makes it necessary that an excessive space for setting the apparatuses be provided. Accordingly, it has been desired to provide an apparatus which overcomes these problems, so as to enable the apparatuses to be stacked in a narrow space in order to improve the efficient utilization of space; and which makes it easy to maintain and manage such an apparatus.

SUMMARY OF THE INVENTION

As mentioned above, as with other kinds of apparatuses, there are many problems to be solved concerning the heating apparatus. The present invention has inclusively studied the above problems to provide approachs therefor.

According to the present invention, a turntable mechanism is provided, which mechanism comprises: a central support axis positioned within a heating chamber of a heating apparatus which provides hot air heating and microwave heating; a turntable of which a central portion is supported by said central support axis, so as to rotate the turntable around the axis; and a driving means for rotating the turntable; wherein said turntable has an entirely flat shape and includes a plane on which food products to be heated can be mounted, a central portion of the flat shape portion being formed into a concave downwardly recessed into the plane so as to be fixed to and supported by the central support axis, said plane and concave of the flat shape portion having a plurality of openings for passing through hot air and the micro-waves, and said driving means being engaged with an outer periphery of the flat shape portion so as to transmit the rotating torque to the flat shape portion. Thus, improvement of the heating function can be accomplished without causing any trouble regarding the rotation of the turntable itself.

Also, in accordance with the present invention, the turntable is rotated by engaging a turntable driving wheel-gear with teeth which are provided at the outer periphery of the turntable, so as to transmit the rotating torque from the turntable driving gear-wheel to the turntable. The turntable gear-wheel is positioned in the corner of the interior of the heating chamber, and is vertically suspended from the ceiling surface of the heating chamber by utilizing a rotating axis penetrating through the axis receptor attached to the ceiling surface of the heating chamber. Thus, the cleaning operation for the heating chamber utilizing water and detergent can be simplified, because the cooking and cleaning operations are not interrupted, and water, oil and juice from the food product does not drop from the axis receptor, thus preventing any troubles regarding the driving portion from occurring. Also, according to the present invention, the air pressed by the fan is introduced into the inside of the axis receptor and a small amount of air is always made to flow into the side of the heating chamber via a gap between the axis receptor and the axis, so as to prevent contaminants and detergent from flowing upwardly into the gap between the axis receptor and the axis, due to operations such as a respiration operation caused by fluctuations in pressure between the inside of the heating chamber and the side of the axis receptor upon repeating the heating and cooling operations in the heating chamber; and a capillarity operation caused by the osmotic power of the detergent, such as a surface active agent, and the small gap between the axis receptor and the axis.

Further, in accordance with the present invention, a turntable apparatus comprising a torque limiter is provided, the turntable apparatus comprises a turntable; a driving source for rotating the turntable; a turntable driving system driven by said driving source; and a turntable driven system engaged with said turntable driving system to rotate the turntable; wherein the turntable driving system includes a means for breaking the engagement between the turntable driving system and the turntable driven system, so as to remove thrust load applied from the turntable driven system to the turntable driving system when overload is imposed on the rotation of the turntable.

Further, in accordance with the present invention, the present apparatus is provided with boards on both the ceiling surface and the bottom surface of the heating chamber, the boards having a plurality of jet ejectors which are referred to as jet plates, so that the heated air generated by means for generating heated air, positioned in a rear side (the interior) of the heating chamber ,can be guided to a cooking chamber area in the front part of the heating chamber and made to flow out as a jet impingement to the food products on the above mentioned turntable, the jet flow finally being made to impinge onto the food to be heated. Parts surrounded by each of the jet plates, the ceiling surface, and the bottom surface of the heating chamber form a passage for the heated air, and the passage, as seen in a side cross sectional view thereof, becomes more tapered in a direction from the rear side (the interior) to the front side of the heating chamber. By means of the above construction, the direction of the heated air flowing in a horizontal direction is gradually changed by up to 90°, so that the heated air finally flows to the food products on the turntable in a vertical direction, such a changing of the flow direction enabling the heated air from the plurality of ejecting pores to effectively provide heat and to flow at a uniform rate. The passage for the heated air is formed by the above mentioned jet plates and recesses on the ceiling and the bottom surfaces of the heating chamber, the recesses being provided with scarfed areas to form the tapered passage. Thus, the present invention realizes a heating chamber having a simplified and very good cleaning operation and also having a good heating performance without the need to use other elements which may cause problems regarding the cleaning operation.

Also, the recess having the scarfed area at the bottom of the heating chamber can be used, upon cleaning the heating chamber, to reserve water therein, the water being heated by the microwaves and an electric heater on the backside of the bottom of the recess, so as to generate vapor. Thus, contaminants attached onto the wall surface of the heating chamber can be easily cleaned away by vapor power as well as chemical power, and further, the recess can be utilized, upon cleaning the heating chamber, to temporarily reserve the exhaust water therein, the exhaust water being mixed up with the water and the detergent for cleaning away contaminants, without allowing the exhaust water to freely flow out from the front side of the heating chamber. If it is required to drain the exhaust water from an exhaust overflow, the exhaust water may be easily drained by providing such exhaust overflow to the recess. Thus, a great improvement in cleaning performance has been achieved, and further, if the components in the front side of the heating chamber (cooking chamber) can be made to be removable ones, the heating apparatus having an improved cleaning performance can be provided.

Also, in accordance with the present apparatus, a heating apparatus is provided, comprising a switch activation means forming an interlock circuit. When the fan guard of the present invention, which is removably fixed to the inside of the heating chamber in front of a means for transmitting the heated air into the heating chamber, is positioned at a predetermined place in the heating chamber, the interlock circuit accurately senses the positioning of the fan guard as the interlock circuit is not effected by the contaminants and temperature in the heating chamber, and without the need to provide any attachments at the outside of the heating chamber, and then activates a switch to allow the generation of the heated air.

Further, in accordance with the present invention, a heating apparatus is provided, which apparatus is provided with, at a part of a exterior cladding of the apparatus body, an exhaust dividing chamber penetrating the apparatus between the upper and the lower sides of the apparatus, and an exhaust tube connected to a heating chamber, the tube extending to the upper side of the apparatus via the exhaust dividing chamber, so as to exhaust smoke and unnecessary vapors and so on from the tube, which are generated at the time of cooking. Wherein, upon a plurality of these heating apparatuses being stacked, the exhaust tubes can be connected and extended within the exhaust dividing chambers, so that harmful smoke, vapors, heated air and so on, can be guided to the apparatus at the highest stage of the stack of the apparatuses.

BRIEF DESCRIPTION OF THE DRAWINGS

The above and related objects, features and advantages of the present invention will be more fully understood by reference to the following detailed description of the preferred embodiments of the present invention when taken in conjunction with the accompanying drawings wherein;

FIG. 9 is activated.

DETAILED DESCRIPTION OF THE PREFERRED EMBODIMENTS

With reference to the drawings attached to the specification, embodiments of the present invention will now be described in detail.

Figure 1:
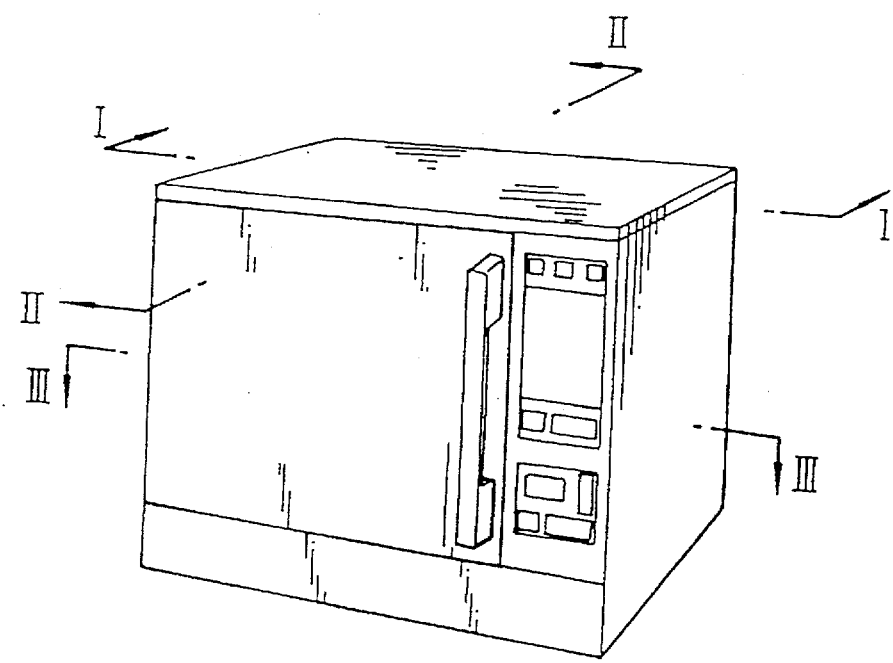
FIG. 1 illustrates a perspective schematic illustration of the heating apparatus in accordance with one embodiment of the present invention.
Figure 2:
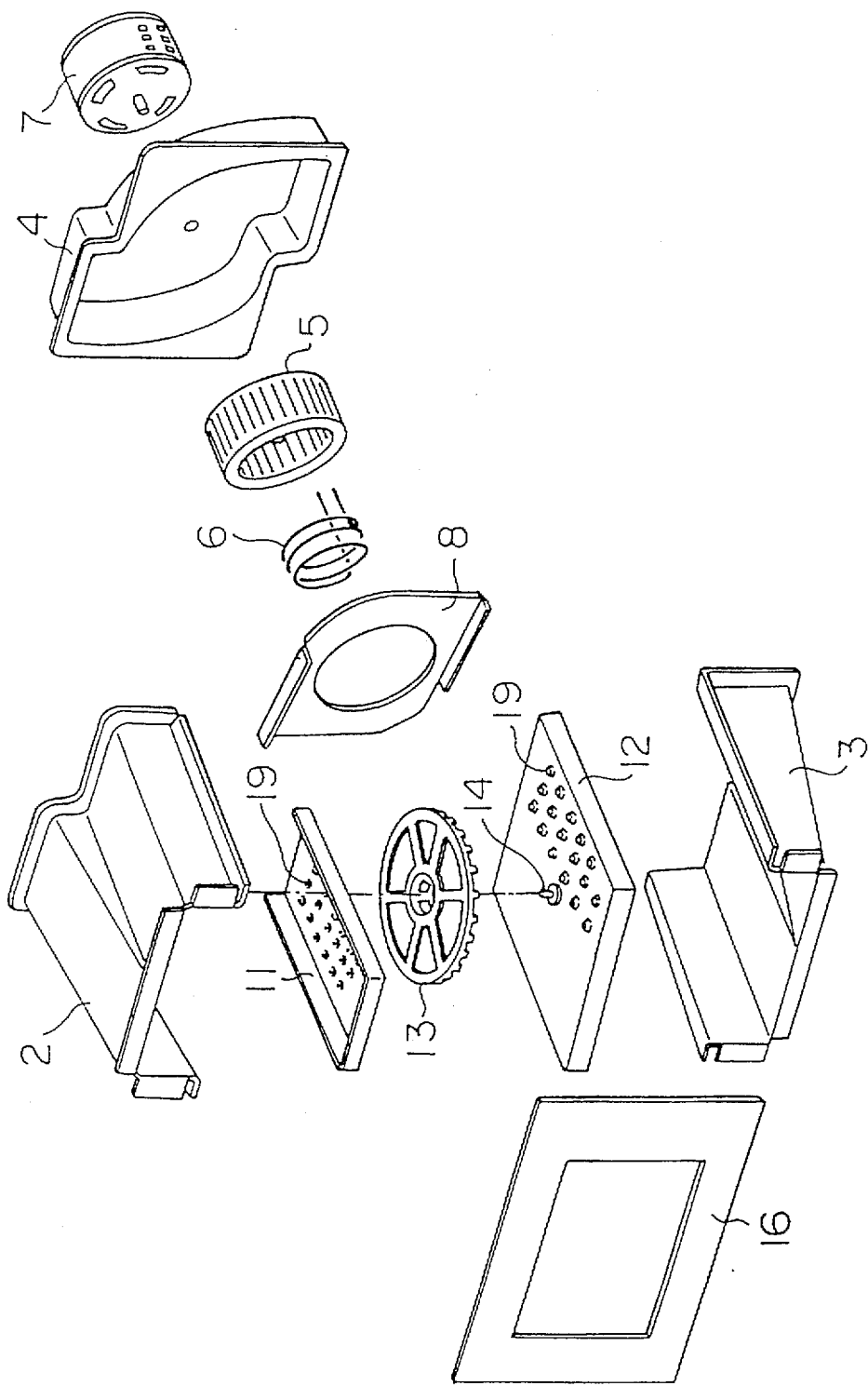
FIG. 2 illustrates one example of the structure for the heating chamber of the heating apparatus in FIG. 1.
Figure 3:
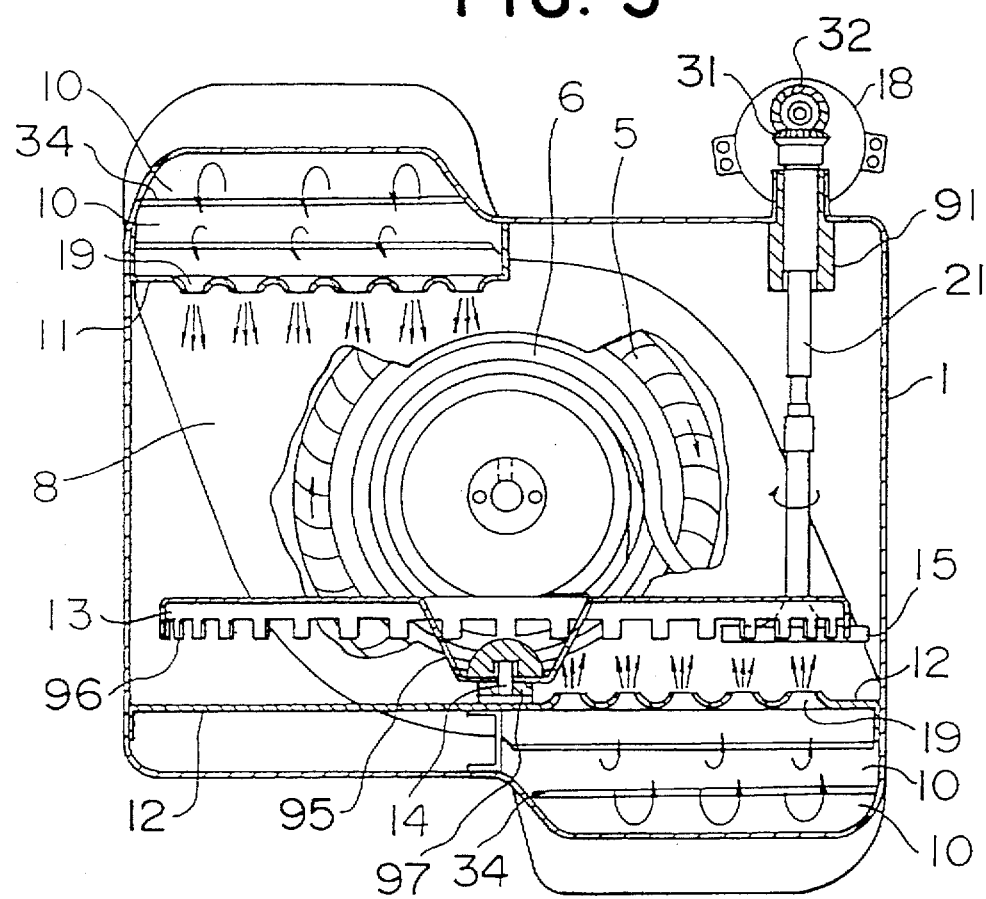
FIG. 3 is a sectional view taken along line I—I of the heating apparatus in FIG. 1.
Figure 4:
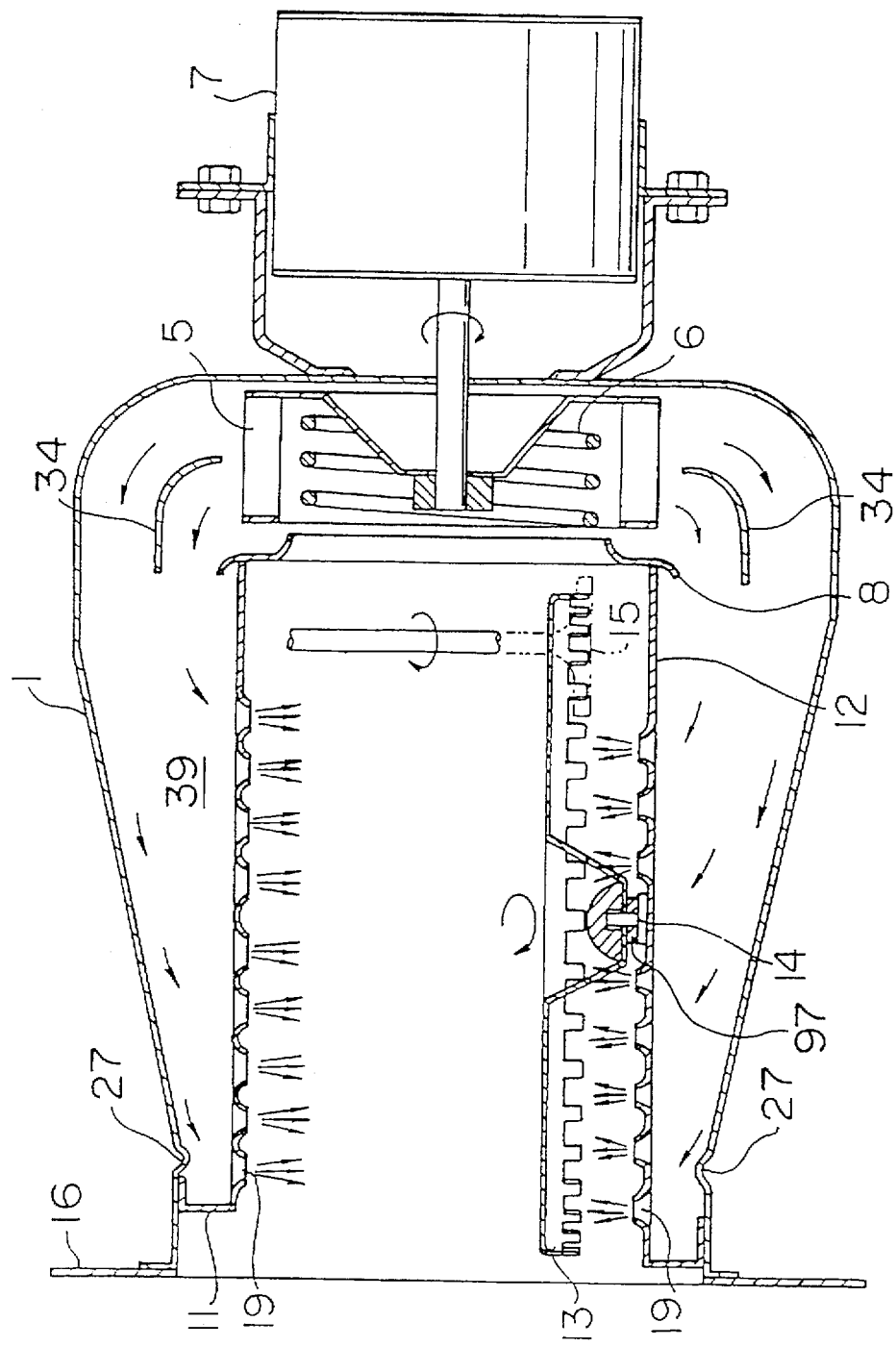
FIG. 4 is a sectional view taken along line II—II of the heating apparatus in FIG. 1.
Figure 5:
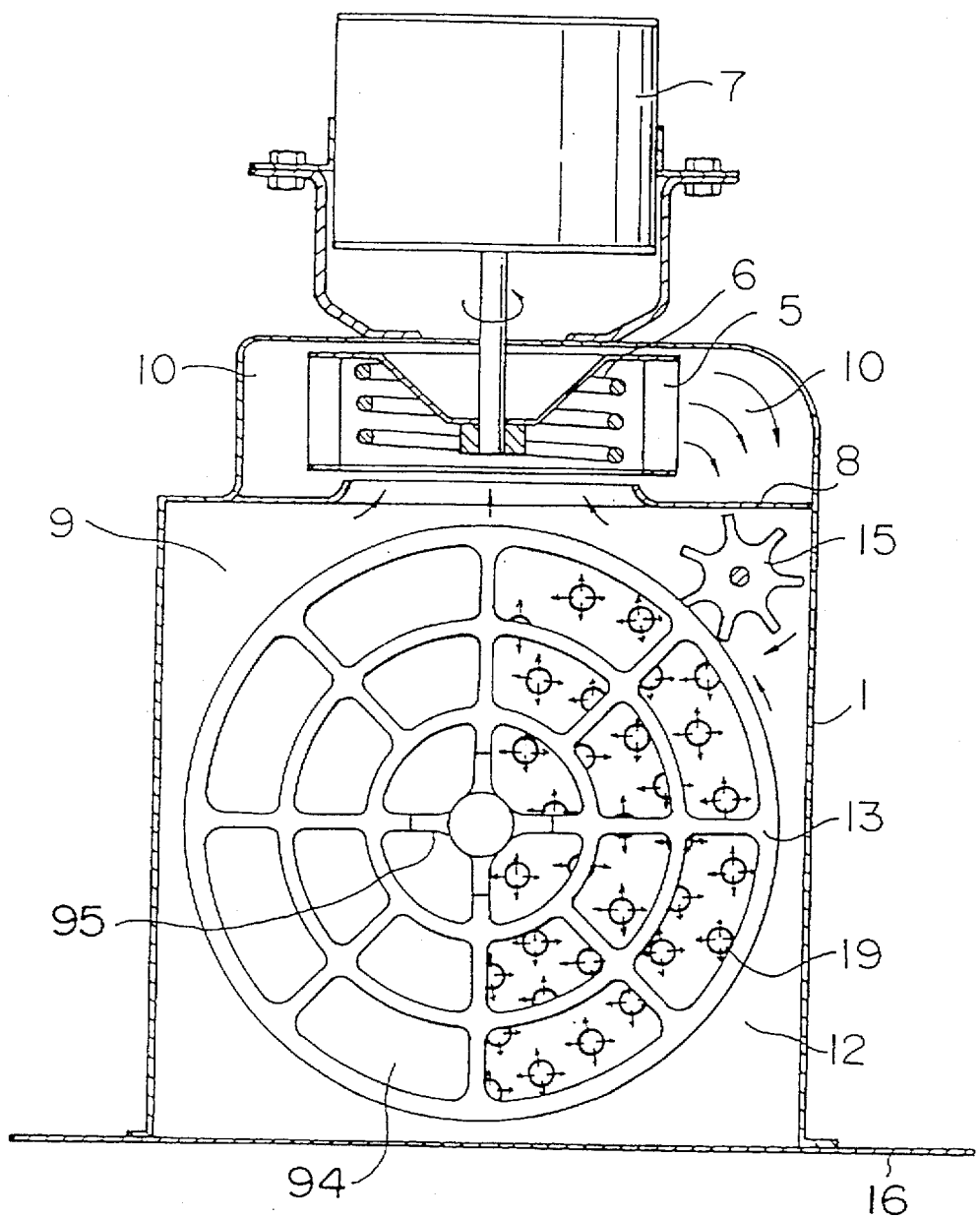
FIG. 5 is a sectional view taken along line III—III of the heating apparatus in FIG. 1.

FIG. 1 illustrates a perspective view of the heating apparatus of the present invention. FIG. 2 illustrates a configuration of the heating chamber of the heating apparatus. Each of FIGS. 3 to 5 illustrates a sectional view of the heating apparatus in FIG. 1 taken along the lines I—I, II—II, and III—III, respectively.

As is clearly shown in FIG. 2, the heating chamber 1 chiefly comprises an upper board 2, a lower board 3, a back board 4, and a front board 16 of the heating chamber.

The back board 4 has a spiral shape which includes air plenums on the upper side and lower side thereof. A fan 5 and a heater 6 are provided in front of the back board 4, and a fan motor 7 for providing the rotating torque to the fan 5 is provided behind the same. The heater 6 is wound into a coil shape and is set in the center of the fan 5 which is positioned at the center of a spiral chamber, so as to reduce air resistance.

The heating chamber 1 is separated by a fan guard 8 into a cooking chamber 9 and a spiral chamber 10. The center part of the fan guard 8 is shaped into a bell-mouth, so as to make the resistance caused by sucking air small. Also, in order to reduce the air resistance caused by blowing out the air, an air blower has been R-bended at a front end thereof.

The spiral chamber 10 is provided with air plenums on upper and lower sides thereof for transmitting the heated air produced by a combination of heat generated by the heater 6 and wind produced by rotating the fan 5. The heated air blown away from the upper and lower sides of the spiral chamber 10 passes through scarfed areas of the upper board 2 and the lower board 3, and then is guided to an upper jet plate 11 and a lower jet plate 12 on the front side of the heating chamber, and finally blown to the heating chamber 1 as a high velocity wind from a plurality of jet valves 19 provided in the upper and lower boards 11, 12.

To accomplish a uniform heating of the food product 17 to be heated, a turntable 13 must be rotated at a predetermined speed during the heating process. A turntable motor 18 which is fixed to a gear box 30 by a turntable motor fixing leg 28 (shown in FIG. 6) generates a torque for rotating the turntable 13.

A turntable axis 14 is fixed to the central part of the lower jet plate 12 to rotate the turntable 13 around the axis. The turntable 13 has a generally planar shape. To rotate the turntable 13 smoothly, a turntable axis receptor 97 (as shown in FIG. 3) is fixed to the central part of the turntable 13. Teeth 96 are engaged with a gear-wheel 15 for driving the turntable, so that the rotating torque is transmitted to the turntable 13, the teeth being separated into many parts of the same size and provided at the outside periphery of the turntable 13.

The gear-wheel 15 is suspended by a connecting shaft 21 and a connecting shaft receptor 91. A left-twisted-spiral-miter-gear-wheel 31 is fixed to the front end of the connecting shaft 21. The left-twisted-spiral-miter-gear-wheel 31 is engaged with a right-twisted-spiral-miter-gear-wheel 32 in such a direction that the left-twisted-spiral-miter-gear-wheel 31 is perpendicular to the direction in which the connecting shaft 21 extends. The left-twisted-spiral-miter-gear-wheel 31 receives the rotating torque generated by the turntable motor 18 via the right-twisted-spiral-miter-gear-wheel 32.

The food product mounted on the turntable 13 is impinged by a jet of the heated air, generated from the jet valves 19 on the upper and the lower jet plates 11, 12, and thereby rapidly heated. The jet valves 19 are preferably arranged in such a way that the entire surface of the plane on which the food product is to be mounted, can be definitely exposed to the jet of the heated air from any of the jet valves upon a rotation of the turntable 13.

(Turntable Mechanism)

As clearly seen in FIG. 5, in accordance with the present invention, a plane of the turntable 13 on which the food product is mounted is provided with many openings 94, so as to allow the heated air and the microwaves to pass through these openings. Further, referring to FIGS. 3 and 4, the central part of the turntable 13 has a recess 95 downwardly concaved against the plane on which the food product is mounted, and arranged to be fixed to and supported by the turntable axis 14, the recess 95 also being provided with openings. Thus, the food product is directly impinged by the jet of the heated air from the lower side of the turntable 13 passing through these openings 94. As a result, according to the present invention, even the central part of the turntable 13 may be effectively heated by the heated air.

The heating operation can be effectively accomplished, even when such an operation is performed in combination with microwave heating, since the microwaves can pass through the openings 94 in the turntable 13 from the lower side thereof to the food product 17.

(Torque Limiter Mechanism)

Figure 6:
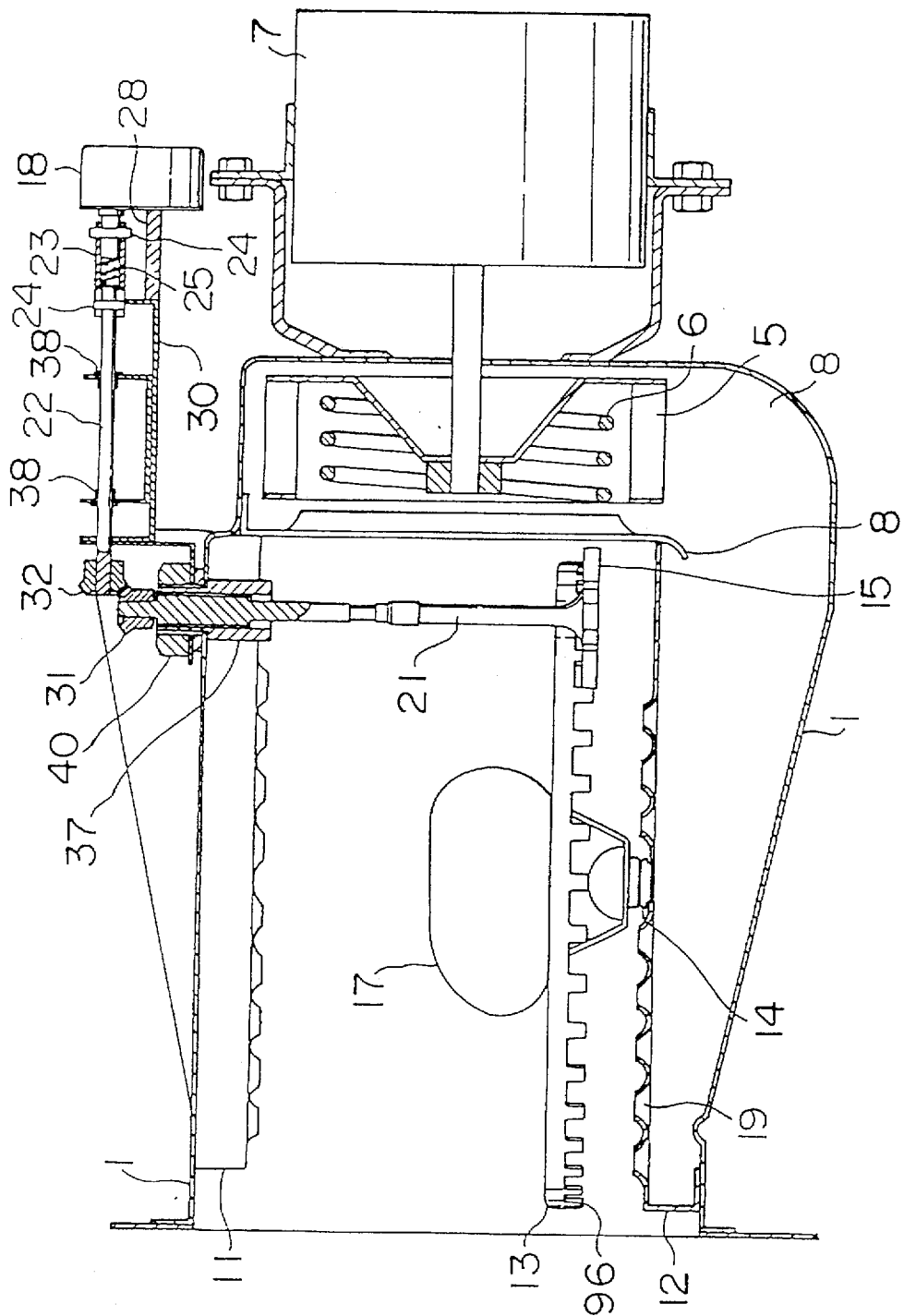
FIG. 6 is a sectional view taken along the line II—II of the heating apparatus in FIG. 1, comprising the torque limiter mechanism.
Figure 7:
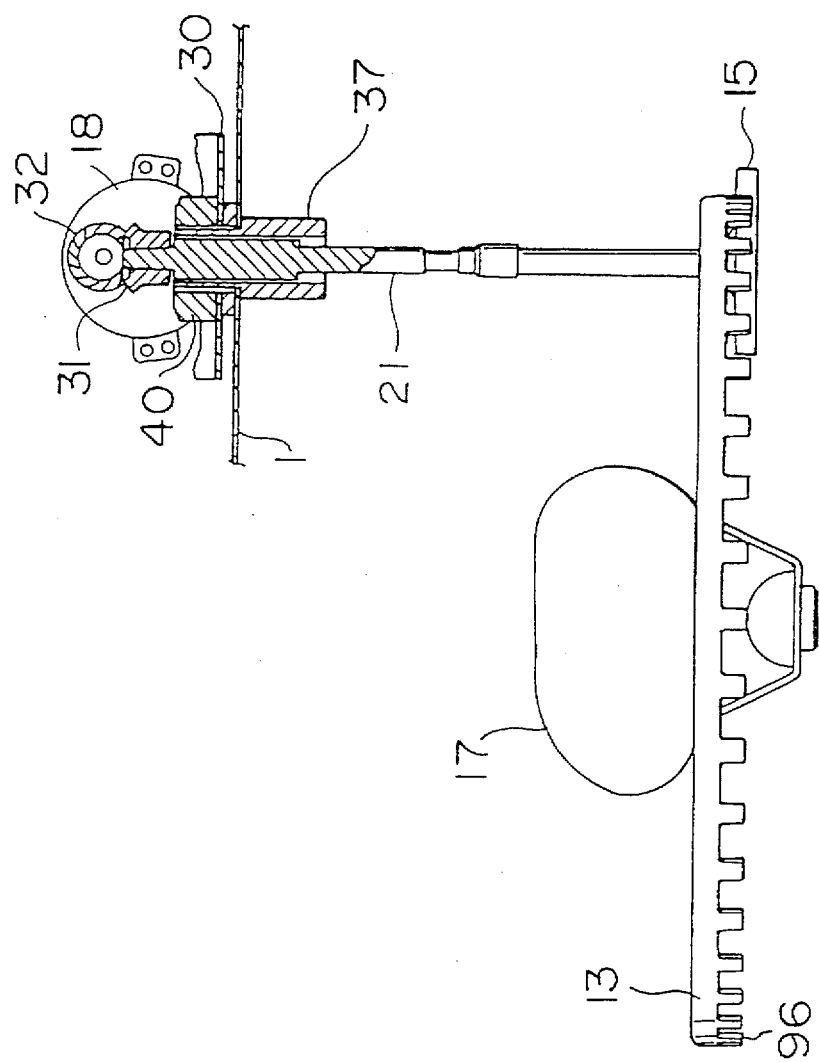
FIG. 7 illustrates only a portion of the turntable driving mechanism of the heating apparatus in accordance with one embodiment of the present invention.
Figure 8:
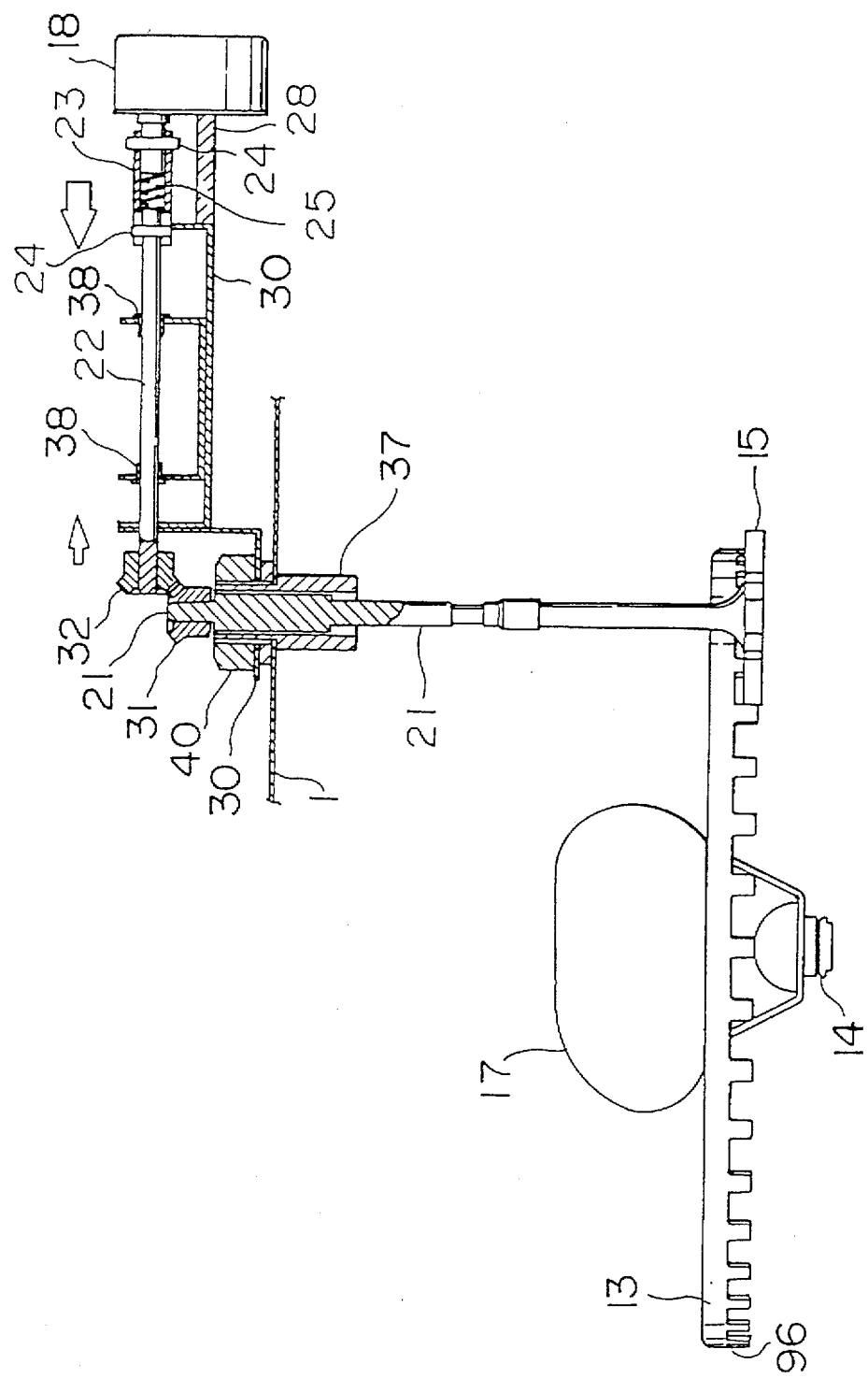
FIG. 8 illustrates the torque limiter mechanism in a normal condition, which is provided in the turntable driving mechanism in FIG. 7.
Figure 9:
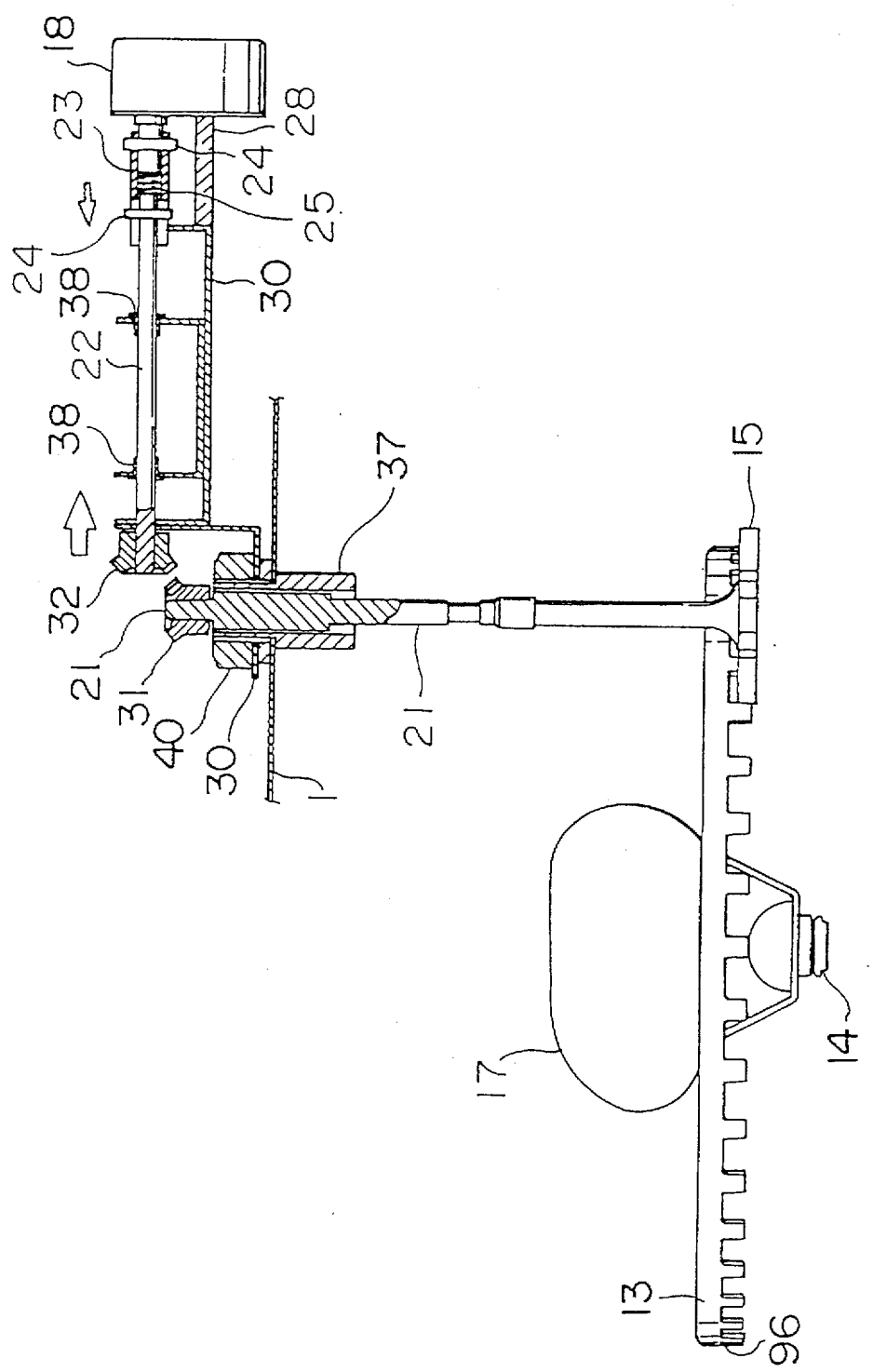
FIG. 9 illustrates the torque limiter mechanism in an active condition provided in the turntable driving mechanism in FIG. 7.
Figure 10:
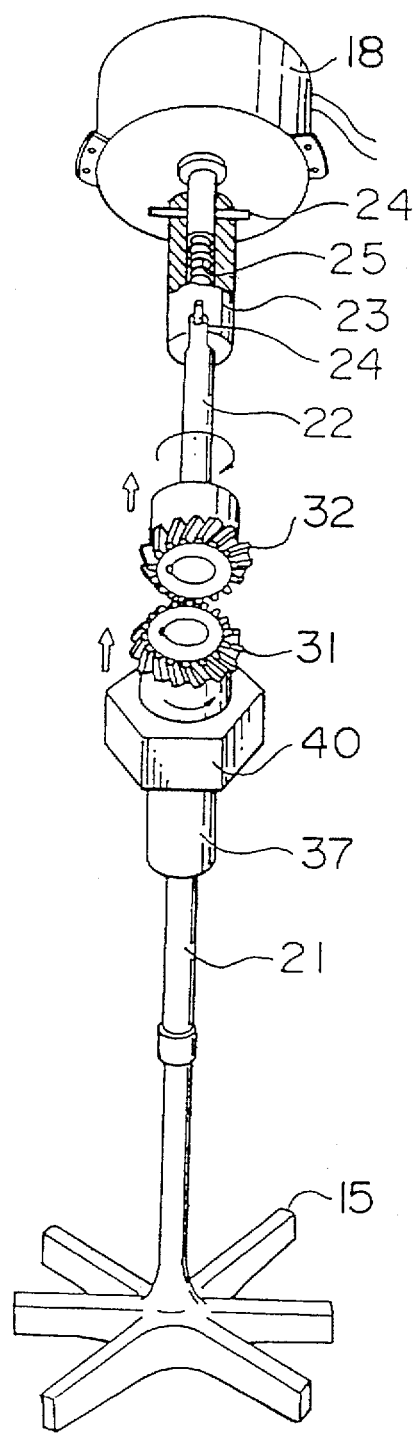
FIG. 10 is a diagram explaining how the torque limiter mechanism in FIG. 8

FIG. 6 is a sectional view taken along the line II—II of the heating apparatus in FIG. 1 having the torque limiter mechanism. Further, each of FIGS. 7 to 9 illustrates a turntable driving mechanism for transmitting the rotating torque generated by the turntable motor 18 to the turntable 13, respectively.

The gear wheel 15 for driving the turntable 13, which is engaged with the teeth 96 provided at the outside periphery of the turntable 13, is connected to the connecting shaft 21, the shaft 21 being further connected to the connecting shaft 22. The front end of the connecting shaft 21 and that of the connecting shaft 22 are fixed to the right and left-twisted-spiral-miter-gear-wheels 31, 32, respectively, these gear wheels 31 and 32 being engaged together to be perpendicular to each other.

An axis receptor 37 for receiving the connecting shaft 21 is fixed to the upper side of the heating chamber 1 by using an axis supporter 40, to rotate the connecting shaft 21 at the inside of the axis supporter 40. The connecting shaft 22 is adapted to rotate between two connecting shaft receptors 38 positioned at the gear box 30. In normal conditions, the connecting shaft 21 is rotated due to the engagement between the left and right-twisted-spiral-miter-gear-wheels 31, 32.

A connecting pin 24 is inserted along a motor direction, at one side opposite to the left-twisted-spiral-miter-gear-wheel 32 which is fixed to the front end of the connecting shaft 22. The connecting pin 24 also serves as a stopper. The connecting shaft 22 is adapted to slide on the inside of a connecting shaft joint 23 in a horizontal direction, which joint is cut into a groove shape, while the front end of a shaft for the motor 18 is fixed to the inside of the connecting shaft joint 23.

A pressure coil spring 25 is positioned in the gap between the connecting shaft joint 23 and the motor 18, where, since in the normal condition, the pressure coil spring 25 is expanded, the rotating torque from the motor 18 will be effectively transmitted from the connecting shaft 22 to the mechanism to be driven.

Upon the turntable 13 being overloaded due to any cause, a thrust load directed in the direction as indicated by an arrow in FIG. 8 will be generated between the right-twisted-spiral-miter-gear-wheel 32 and the left-twisted-spiral-miter-gear-wheel 31. Even when the thrust load is generated, when a pressure generated by the pressure coil spring 25 is stronger than pressure strength of the thrust load, the rotating torque of the motor 18 can be properly transmitted to the turntable driving gear wheel 15. FIG. 8 illustrates this condition.

The pressure coil spring 25 will be pressed toward the motor 18, when the pressure strength of the thrust load becomes larger than the pressure from the pressure coil spring 25, due to the imposition more than a predetermined quantity of overloading on the turntable 13 or the locking of the turntable 13 for any reason. FIG. 9 illustrates this condition.

Referring now to FIG. 9, the pressure coil spring 25 will be, in this case, pressed so that the right-twisted-spiral-miter-gear-wheel 32 is rotated without engaging with the left-twisted-spiral-miter-gear-wheel 31. As a result, the motor 18 is prevented from being directly loaded, that is, an overloading removing mechanism or the torque limiter mechanism will act effectively.

Accordingly, the present invention provides the torque limiter mechanism for mechanically releasing the engagement between the turntable driving mechanism and the turntable driven mechanism.

(Jet Impingement Mechanism)

In connection with FIGS. 3 to 5, the heating apparatus using a jet impingement technique of the present invention will be described below. Each of the upper and lower jet plates 11, 12 comprises a plurality of impingement pores each having a nozzle shape, so that the heated air guided via the scarfed areas of the upper and lower boards 2, 3 can be changed to an ultra-high speed jet, after passing over these areas.

Now, according to the heating apparatus of the present invention, one part of each of the upper and lower boards 2 and 3 is comprised of a scarfed area, a cross-sectional view of which is tapered in a direction from the rear side to the front side of the heating chamber 1. A front end of each of the scarfed areas has a ⌐┐-shape 27, so as to reduce the amount of air generated by the fan 5 and leaking from the clearances between the front ends of the upper and lower jet plates 11, 12 and the wall surface of the heating chamber. A rectification board 34 is provided to change the air flow generated by the fan 5 into a layer flow, so as to reduce air pressure loss.

The scarfed areas provided on the upper board 2 and the lower board 3 form the heating chamber 1, and also act as passages for the heated air generated by means of the fan 5 and the heater 6. By providing such scarfed areas, the velocity of the heated air flowing from a plurality of jet impingement pores on the upper and the lower jet plates 11, 12, is made uniform.

The components, such as the upper jet plate 11, lower jet plate 12, fan guard 8, turntable axis 14, turntable driving gear wheel 15 and so on, can be simply secured to and removed from the body. For example, the fan guard 8 can be easily positioned between portions of the inner wall surface of the heating chamber 1 by pushing end edges of the fan guard. The upper jet plate 11 and the lower jet plate 12 can be easily positioned between the inner wall surface of the heating chamber 1 and a wall of the fan guard 8 by pushing end edges of the plates 11 and 12. Also, the turntable 13 can be removed from the turntable axis 14. The turntable axis 14 is removable, as is the lower jet plate 12, and the turntable driving gear wheel 15 is adapted so that the axis of the connecting shaft 21 is easily fitted into the center thereof.

Figure 12:
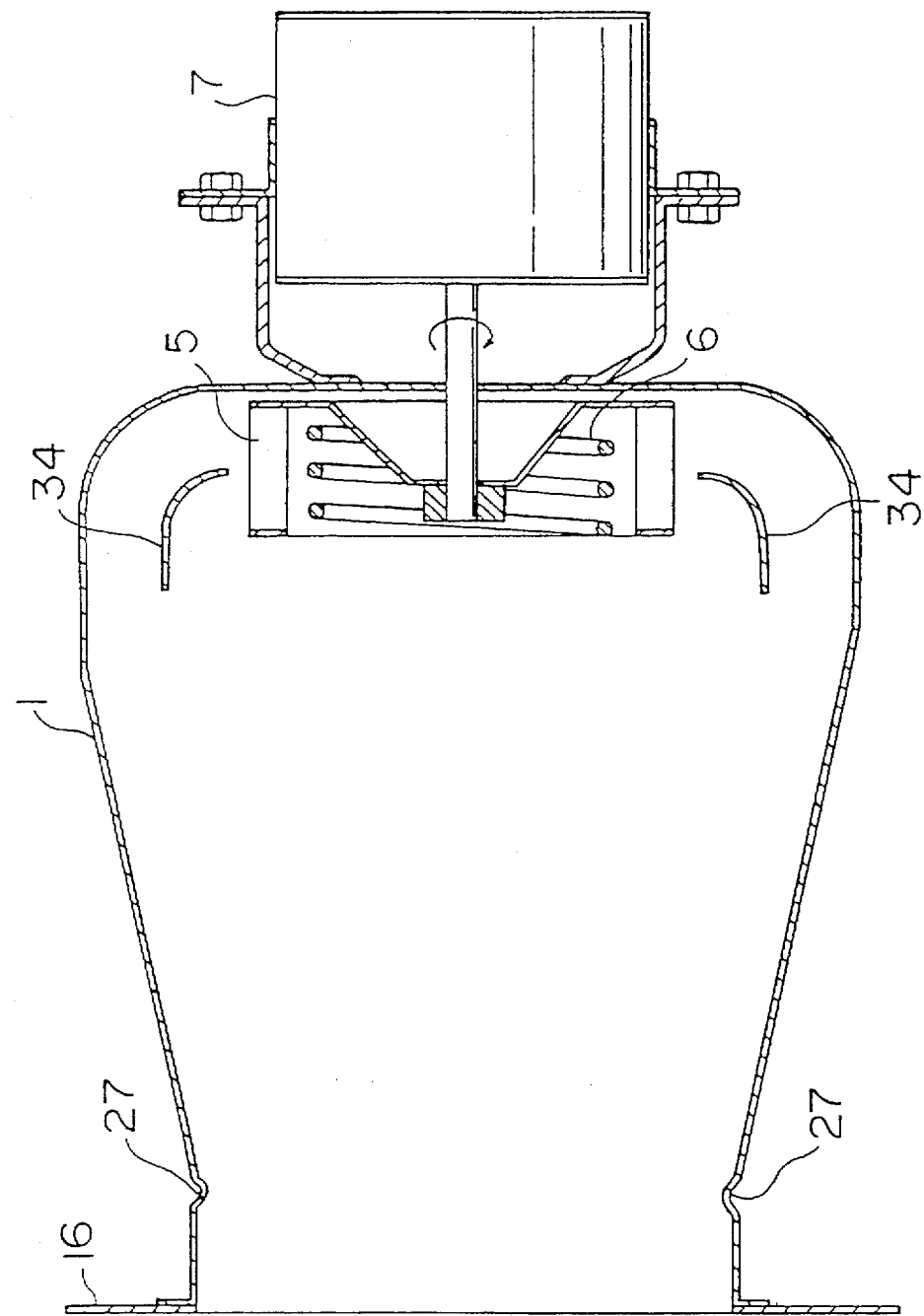
FIG. 12 is a sectional view taken along the line II—II of the heating apparatus in FIG. 1, after the components within the heating chamber have been removed.
Figure 13:
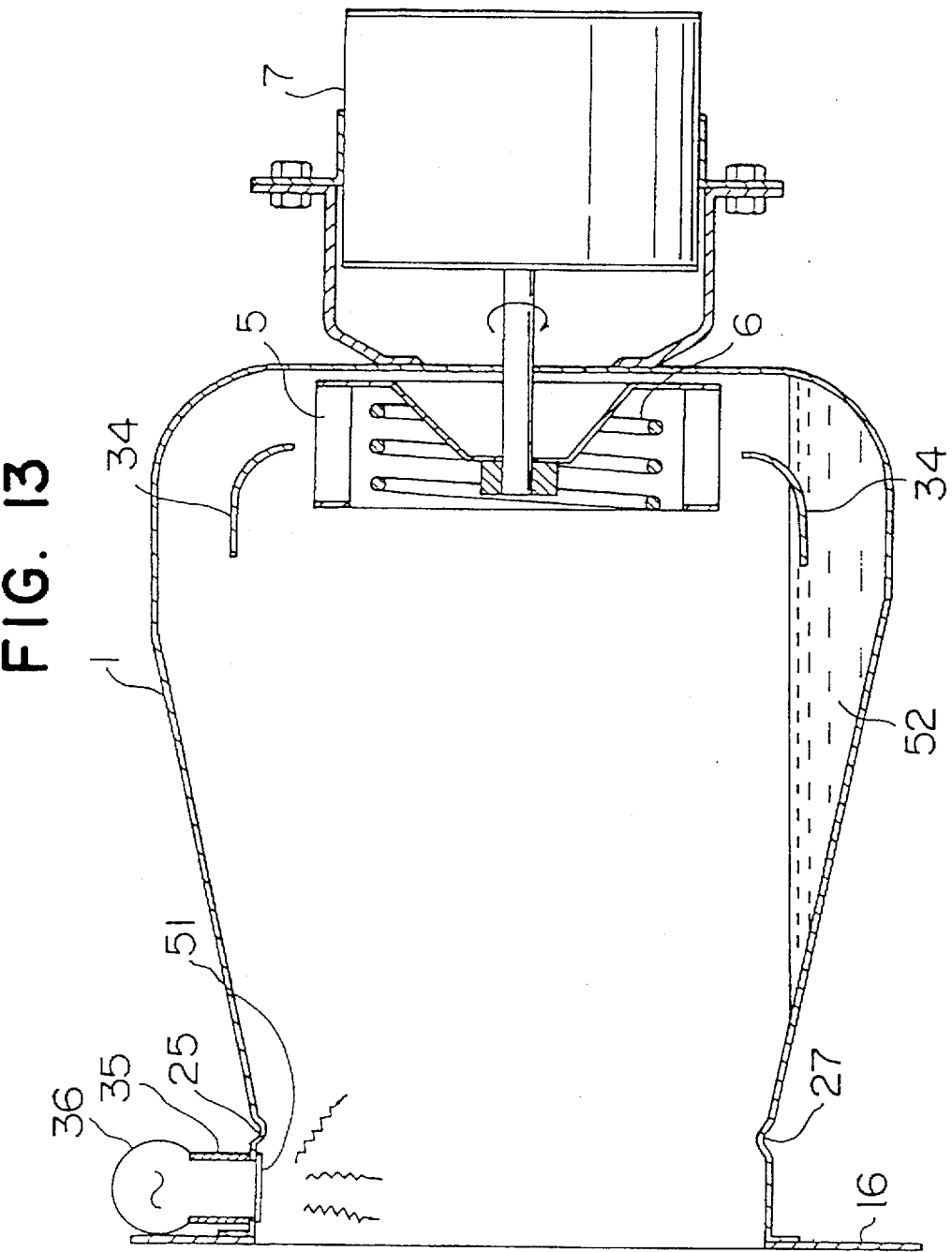
FIG. 13 illustrates the heating apparatus in FIG. 12, comprising the microwave heating device, the bottom thereof reserving water therein.

As shown in FIG. 12, upon removing all the above components, only the fan 5, heater 6, and rectification board 34 would be left in the heating chamber 1, . Accordingly cleaning performance of the heating chamber 1 can be enhanced. Referring now to FIG. 13, by reserving water and detergent 52 at the recess at the scarfed area of the bottom part of the heating chamber 1 and then heating these by means of microwaves and an electric heater (not shown) provided behind the bottom surface of the heating chamber 1, so as to change the water and the detergent into vapor, contaminants attached to the wall surfaces of the heating chamber 1 can be made easy to clean away by means of the vapor power.

Figure 11:
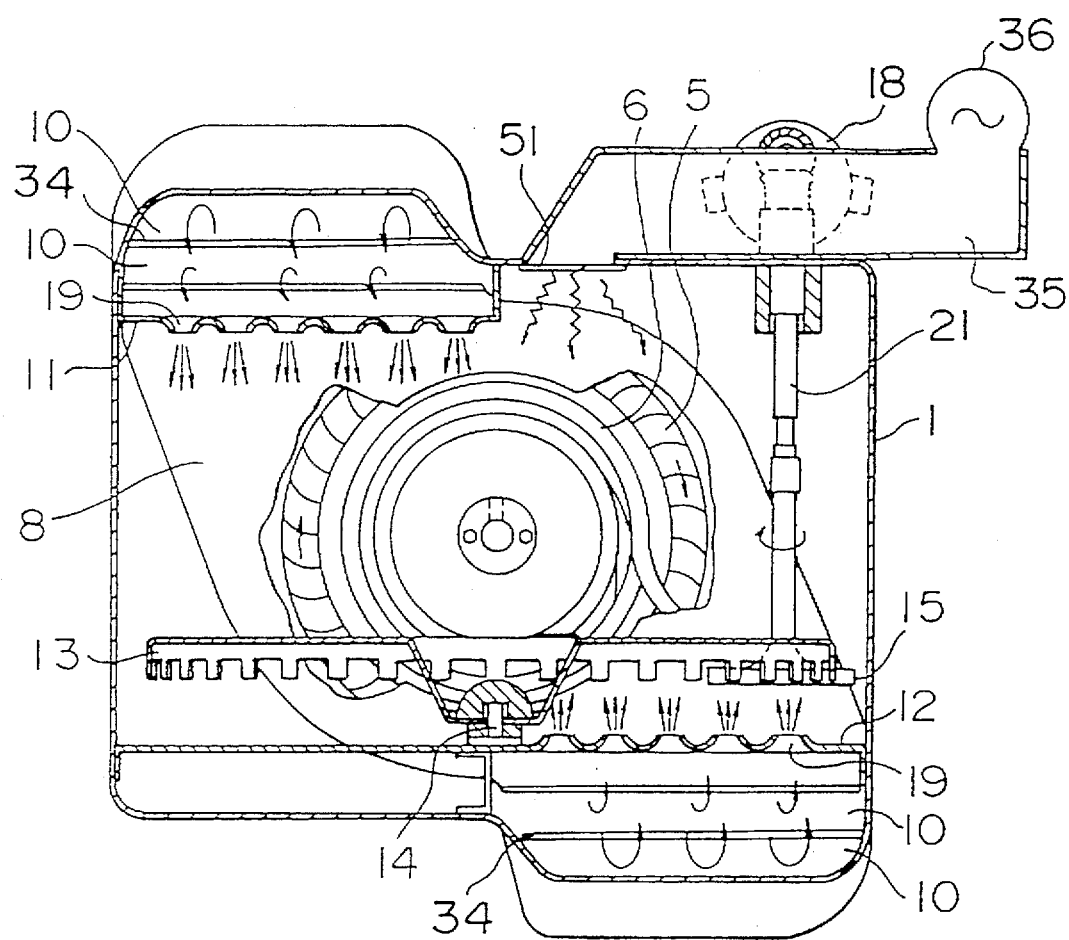
FIG. 11 is a sectional view taken along the line I—I of the heating apparatus in FIG. 1 provided with a microwave heating device.

FIG. 11 illustrates a sectional view taken along a line I—I of the heating apparatus in FIG. 1, the apparatus additionally comprising a microwave heating device used as a heating source. A waveguide 35 is attached to the upper side of the heating chamber 1 to transmit the microwaves to the heating chamber 1, the microwaves is generated by a microwave generator 36 at the end of the heating apparatus. A cover 51 provided at the front end portion of the waveguide 35 on the side of the heating chamber 1 is made from materials having a small dielectric loss coefficient, so as to be able to prevent heated air and gas generated by the food product from entering into the waveguide. If the material of the upper jet plate 11 is made from small dielectric loss coefficient materials, an opening of the waveguide 35 can be positioned at the upper surface of the upper plate 11 of the heating chamber 1.

(Fan Guard)

Figure 14:
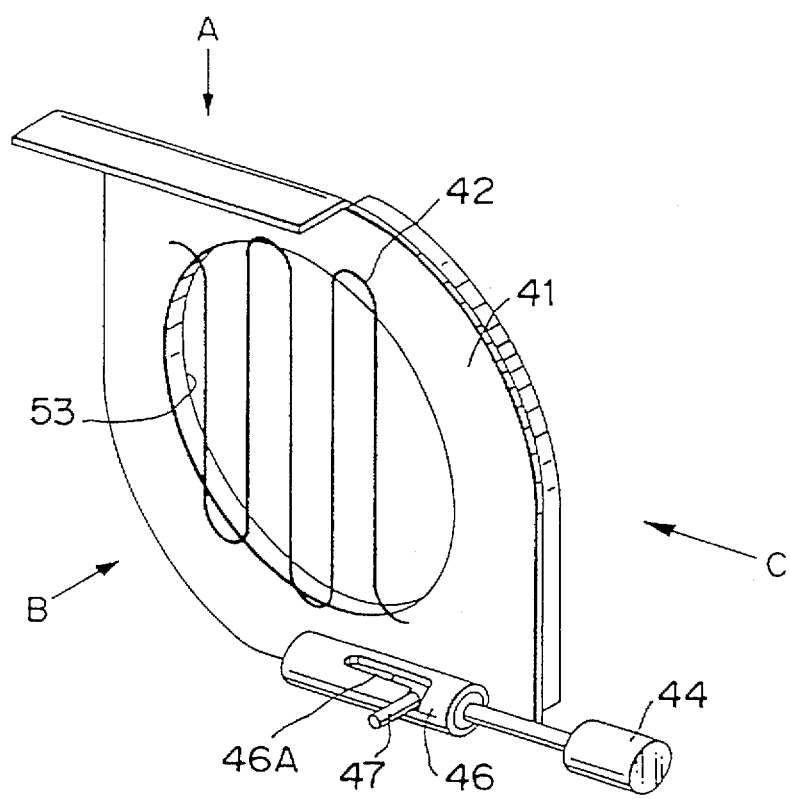
FIG. 14 is a perspective schematic illustration of the fan guard in accordance with one embodiment of the present invention.
Figure 15:
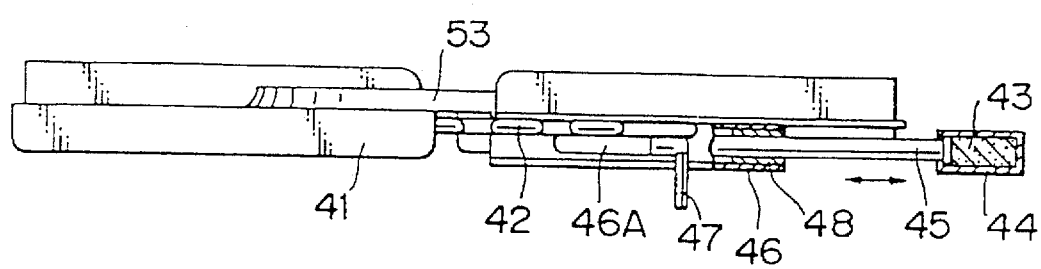
FIG. 15 is a partly sectional fragmentary view of the fan guard in FIG. 14 as seen from the direction of the arrow "A" thereof.
Figure 16:
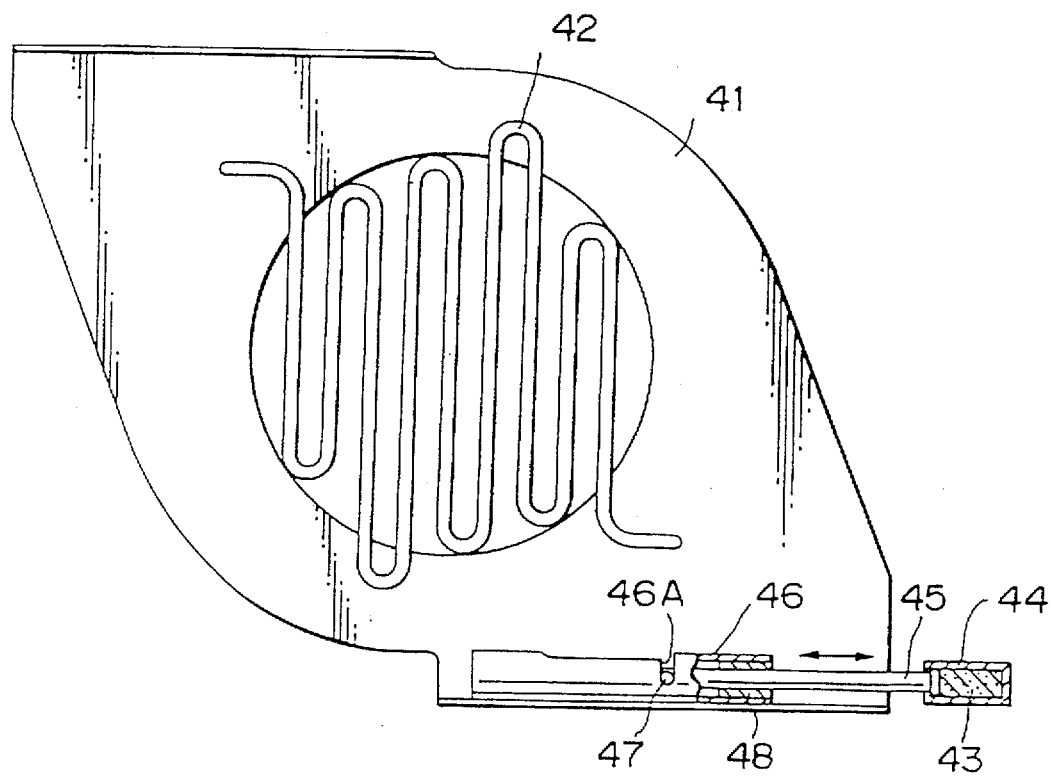
FIG. 16 is a partly sectional fragmentary view of the fan guard in FIG. 14 as seen from the direction of the arrow "B" thereof.
Figure 17:
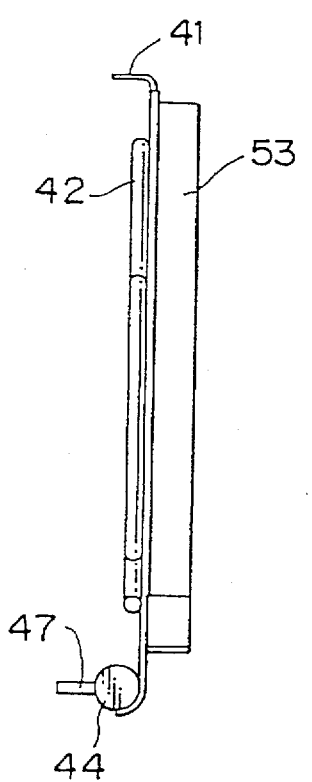
FIG. 17 is an enlarged view of the fan guard in FIG. 14 as seen from the direction of the arrow "C" thereof.

FIGS. 14 to FIG. 17 illustrate a heating apparatus having a fan guard of the present invention. FIG. 14 is a perspective, schematic illustration of the fan guard according to one embodiment of the present invention. FIG. 15 is a partly sectional fragmentary view of the fan guard in FIG. 14 as seen from the direction of an arrow "A" in FIG. 14. FIG. 16 is a partly sectional fragmentary view of the fan guard in FIG. 14 as seen from the direction of an arrow "B" in FIG. 14. FIG. 17 illustrates an enlarged view of the fan guard in FIG. 14 as seen from the direction of an arrow "C" in FIG. 14.

As seen from these Figures, the fan guard comprises a fan guard plate 41, having a spiral shape so as to define a circulation wind air plenum at two places between an upper inside wall and a lower inside wall of the heating chamber 1, when the fan guard plate 41 is attached to the inside of the heating chamber 1. A bell mouth member 53 is formed at the center of the fan guard plate 41 for sucking air. Further, a fan guard net 42, parts of which are appropriately separated from each other, is attached to an opening of the bell mouth 53 of the fan guard plate 41, so as to prevent a user from inserting in error his hand or fingers into the opening.

A holder rail 46 is attached to the lower side of the fan guard plate 41. The holder rail 46 is made of a metallic tube and is provided with an axis receptor 48 at the inside of the front end portion thereof. As clearly shown in FIG. 14, a guide fixing groove 46A having an almost L-shape is formed at the outside periphery of the metallic tube of the holder rail 46. A magnet holder 45 is secured to the holder rail 46 in such a way that the holder can be moved along the inside of the axis receptor 48 of the holder rail 46. The front end portion of the magnet holder 45 is provided with a magnet 43 made from rare earth elements having a good demagnetizing characteristic at a high temperature. The magnet 43 is accommodated in a magnet case 44 for protecting the magnet 43 from being damaged, and concentrates a magnetic flux on the front end portion of the magnet holder 45.

A holder lug 47 is provided near the end of the magnet holder 45 opposite to the end on which the magnet 43 is attached. The magnet lug 47 is projected to the outside of the holder rail 46 through the L-shape guide fixing groove 46A formed in the holder rail, so as to enable the user of the heating apparatus to operate the magnet holder 45 by hand. As shown in FIGS. 14 to FIG. 16, when the holder lug 47 is positioned in a groove portion corresponding to a shorter leg of the L-shaped guide fixing groove 46A, the magnet holder 45 is fixed in position so that it can not be moved in either a right or left direction. To move the magnet holder 45 under such a fixed condition, the holder lug 47 must be operated to rotate the magnet holder 45 in the axis receptor 48, so as to move the magnet lug to a groove position corresponding to a longer leg of the guide fixing groove 46A, and further move it in the left direction in the Figures along the longer leg of the groove 46A, thereby moving the magnet holder 45 in a left direction which results in the movement of the magnet 43 from a fixed position to a pulled back position. To move the magnet 43 from the pulled back position to the fixed position as shown in FIG. 14 to FIG. 16, an operation the reverse of the above is used.

Figure 18:
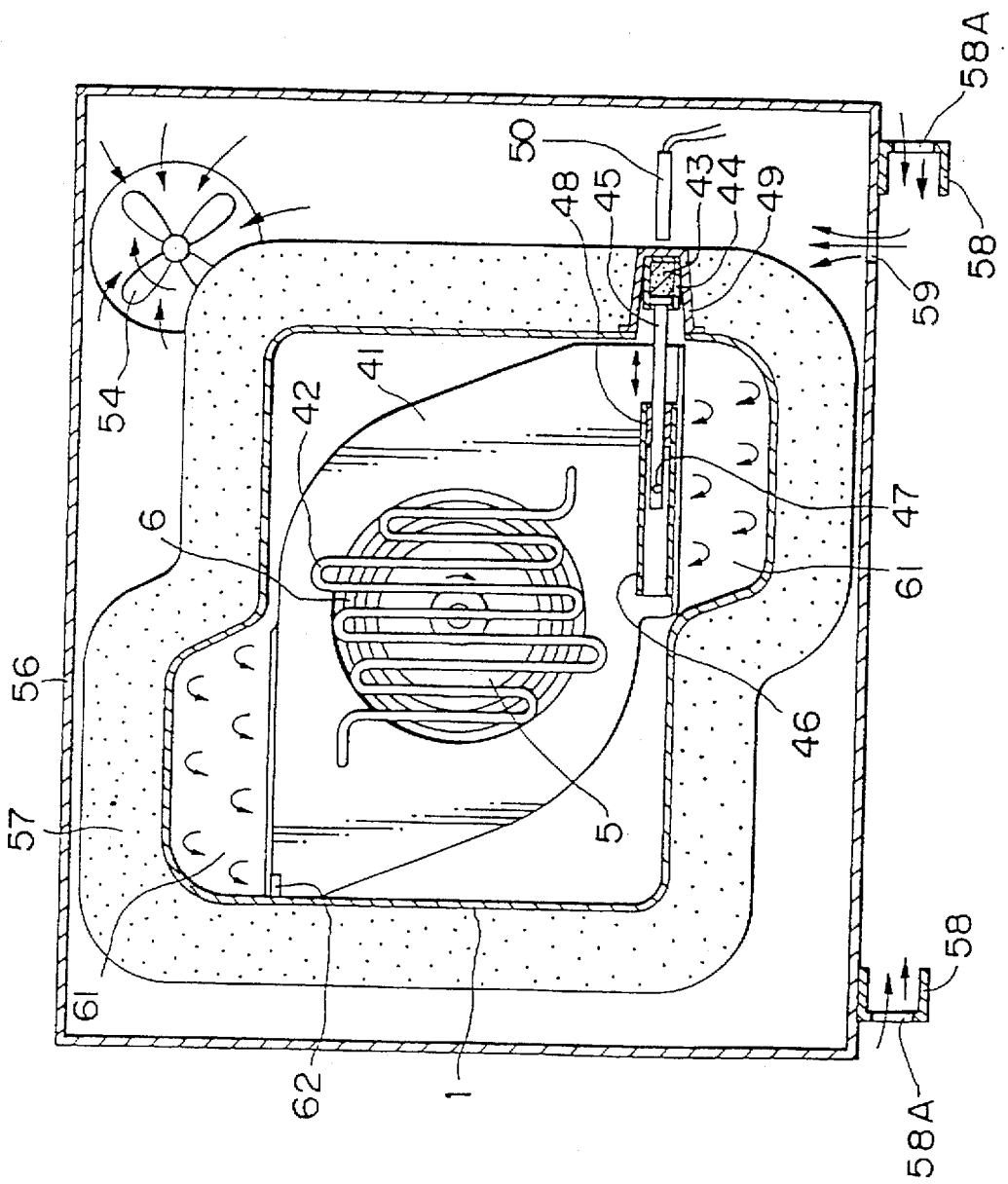
FIG. 18 is a sectional view taken along the line I—I of the heating apparatus in FIG. 1 provided with the fan guard in FIG. 14.
Figure 19:
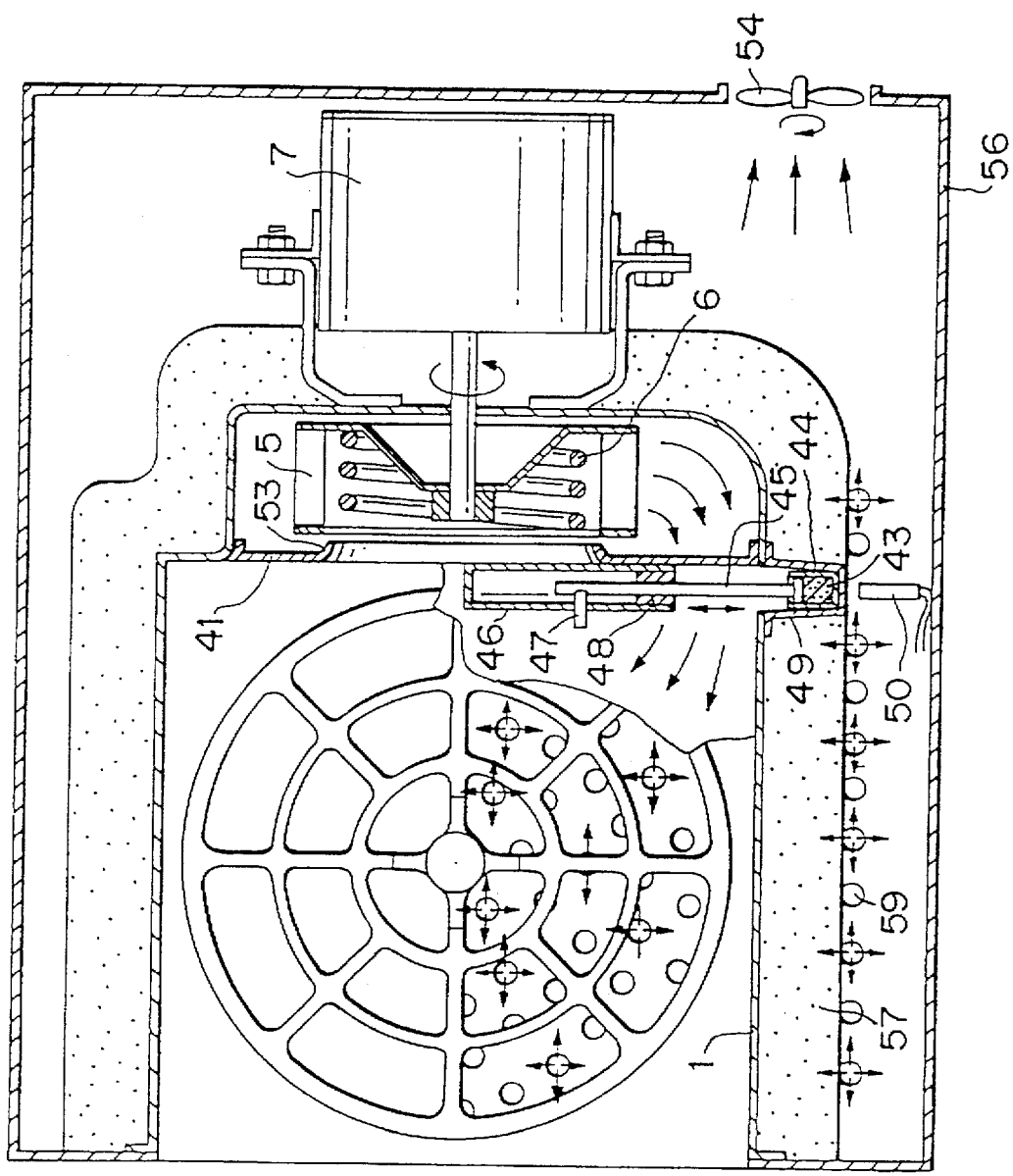
FIG. 19 is a sectional view taken along the line III—III of the heating apparatus in FIG. 1 provided with the fan guard in FIG. 14.

FIG. 18 is a sectional view taken along the line I—I of the heating apparatus in FIG. 1, comprising the fan guard of the present invention. FIG. 19 is a sectional view of the heating apparatus, taken along the line III—III. Referring now, in particular, to FIGS. 18 and 19, a description will be given of an operation for fixing the fan guard as explained in connection with FIG. 14 to FIG. 17 of the invention at a predetermined position within the heating chamber of the heating apparatus. The fan guard can be removed from the front side of the heating chamber 1 of the heating apparatus. Upon setting and removing the fan guard, the holder lug 47 is operated to slide the magnet holder 45 into the pulled back position thereof, so that the magnet case 44 accommodating the magnet 43 can be moved to be in a plane of the fan guard plate 41.

In an inner part of the heating chamber 1, the fan 5 driven to be rotated by the fan motor 7 is positioned. The heater 6 is disposed at the inner periphery of the fan 5. The fan guard 8 is removably positioned at the front portion of the fan 5 within the heating chamber 1. To accomplish this, a fixing pin 62 is provided on the upper portion of the side wall of the heating chamber 1, and a magnet case guide 49 is provided on the lower portion thereof. The magnet case guide 49 is embedded in a thermal insulant 57, so as to prevent the atmosphere in the heating chamber 1 from leaking out.

The magnet case guide 49 has a tube shape of which a front end portion is closed, the tube shape enabling the magnet case 44 to be fit into the magnet case guide 49, the magnet case 44 being attached to the front end portion of the magnet holder 45 of the fan guard 8. A magnet close switch 50 is fixed, at the outside of the heating chamber 1, to a portion apart by a predetermined distance from a front end portion of the magnet case 44. The magnetic close switch 50 may be connected to an electric circuit for applying electrical power to the fan motor 7 and the heater 6, and be designed to be almost opened, but then closed when the fan guard is fixed to the inside of the heating chamber 1, thereby sliding the magnet holder 45 to insert the magnet case 44 into the magnet case guide 49.

The fan guard 8 can be mounted on and fixed to a predetermined position in the heating chamber 1, by setting the fan guard at the predetermined position in front of the fan 5 in the heating chamber 1, engaging the upper portion of the fan guard plate 41 to the pin 62 provided on the inside wall of the heating chamber 1, and then sliding the magnet holder 45 from the pulled back position, so as to fit the magnet case 44 into the magnet case guide 49. Thus, the holder rail 46, axis receptor 48, magnet holder 45, magnet 43 and magnet case 44, mounted on and fixed to the fan guard plate 41, can partially constitute a means for fixing the fan guard to the inside of the heating chamber 1.

Thus, in accordance with the fan guard of the present invention, when the fan guard is properly fixed to the predetermined position in the heating chamber 1, since the magnet close switch 50 is closed by utilizing the activation of the magnet 43, the fan and the heater will be correctly operated by switching on the electric power for the electric circuit incorporating the fan motor and the heater. On the other hand, since the magnet close switch 50 is still kept open as long as the fan guard 8 is correctly fixed to the predetermined position in the heating chamber 1, turning on of the power source for the fan 5 and heater 6 will not cause the activation of the fan 5 and the heater 6.

The magnet close switch 50 is positioned close to the magnet case guide 49 which has a high temperature due to its nature. In this embodiment, to prevent heat from being transmitted from the magnet case guide 49, fresh air is made to flow out from the part between the magnet case guide 49 and the magnet close switch 50. For the configuration to accomplish the above function, a cooling fan 54 is additionally provided for introducing the fresh air from a plurality of intakes 59 opened at the bottom of the cladding 56, passing the air between the magnet case guide 49 and the magnet close switch 50, and finally exhausting the air to the outside thereof via the fan 54. The fresh air is obtained from a plurality of holes 58A, which holes are provided on a side surface of the leg 58 positioned at the bottom of the cladding 56. Thus, the leg 58 can be positioned at more inner parts of the front side of the apparatus body than the cladding 56, and thus make the operation for obtaining the fresh air possible, even if the cladding 56 comes in contact with another perpendicular wall.

As is clearly shown in FIG. 18, in a condition that the fan guard is attached and secured to a predetermined position within the heating chamber 1, the air plenums 61 for circulating wind are defined at the upper and lower portions of the heating chamber 1. Thus, when the fan 5 is driven to rotate it, the sucking air from the bell mouth 53 of the fan guard plate 41 is heated by the heater 6 disposed at the central part of the fan 5, and thus the heated air is blown away from the upper and the lower air plenum 61 into the heating chamber 1. Also, as shown in FIGS. 18 and 19, to insulate the heating chamber 1, the surrounding outside perimeter of the heating chamber 1, except for the front end portion of the magnet case guide 49, is covered with insulating materials 57. The fresh air from the fresh air intakes 59 cools the surface of the insulating materials 57 when it flows over the surfaces of the materials.

The magnet case guide 49 makes it easy to insert and take out the magnet case 44 thereinto or therefrom by having a diameter at its opened side larger than that at its closed side at the front end. In the embodiment above mentioned, while the magnet 43 has been described as being used for a switch activator and the magnet close switch 50 as being used for the heat air generator, they are not limited to such applications, as any combination is all right if it accomplishes the above same functions.

(Exhaust Tube)

Figure 20:
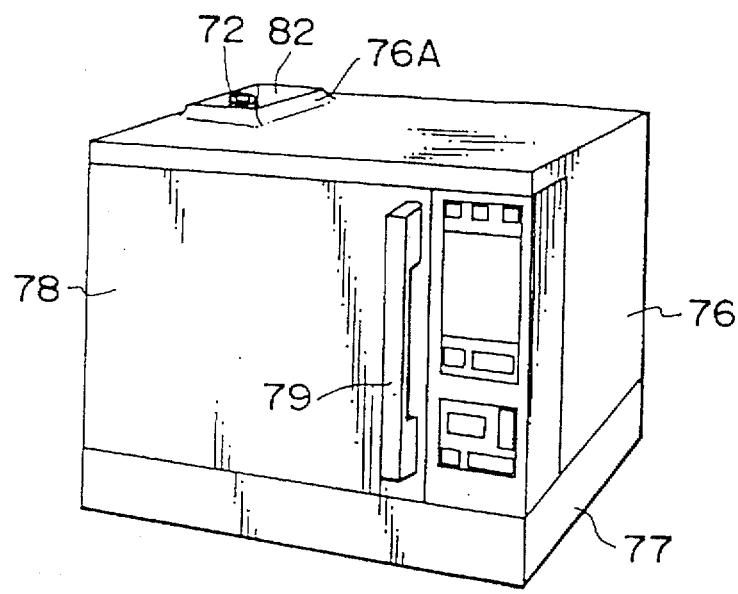
FIG. 20 is a perspective view of the heating apparatus in accordance with the present invention having the exhaust pipe.
Figure 21:
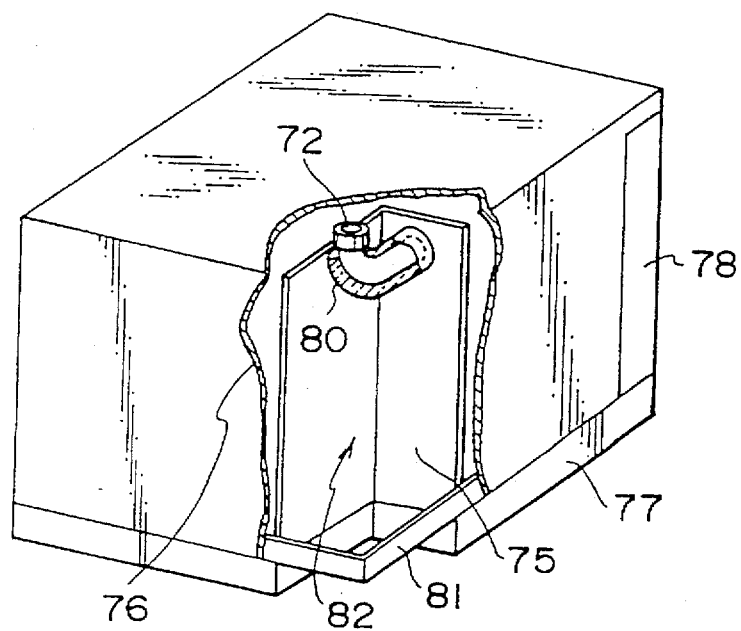
FIG. 21 is a partially cutaway perspective view of the heating apparatus in FIG. 20 as seen from the rear side thereof.

Referring now to FIG. 20 and FIG. 21, the heating apparatus having the exhaust tube of the present invention will be described below. FIG. 20 is a perspective view of the heating apparatus according to one embodiment of the present invention. FIG. 21 is a partially cutaway perspective view of the heating apparatus in FIG. 20 as seen from the rear side thereof. As shown in these Figures, the heating apparatus of the present embodiment comprises a leg part 77 positioned at a lower portion of an exterior cladding 76, and a door 78 positioned at the front surface of the heating apparatus, the door 78 including a door handle 79.

As is clearly shown in FIG. 21, an exhaust sectional chamber 82 penetrating the heating apparatus between upper and lower sides thereof, is defined at one of the corners in the rear side of the exterior cladding 76. The sectional chamber 82 is defined by the following steps: defining a square hole in a bottom board 81; defining the leg 77 which has been bent along the square hole at the bottom board of the apparatus body; providing a sectional board 75 for a heating room to partition therefrom part of the interior of the heating room; and defining a square hole, which is similar to the above one, at the ceiling of the exterior cladding 76.

The exhaust pipe 72 as used for the exhaust tube is prepared in such a way that one end thereof is connected to the heating chamber via a circular hole which is provided in an upper portion of the sectional board 75, and another end thereof is extended so as to provide an opening in the upper side of the heating apparatus by passing through the sectional chamber 82. For the reasons as mentioned below, the front end portion of the opening of the exhaust pipe 72 should preferably be extended. An insulating material 80 is wound around the exterior periphery of the exhaust pipe 72 in the sectional chamber 82. As is clearly shown in FIG. 20, a portion 76A at the top of the exterior cladding 76 surrounds the square hole of the sectional chamber 82, and has a ⌐┐-shape, so as to prevent any contaminants on the top surface of the exterior cladding 76 from entering into the sectional chamber 82.

Figure 22:
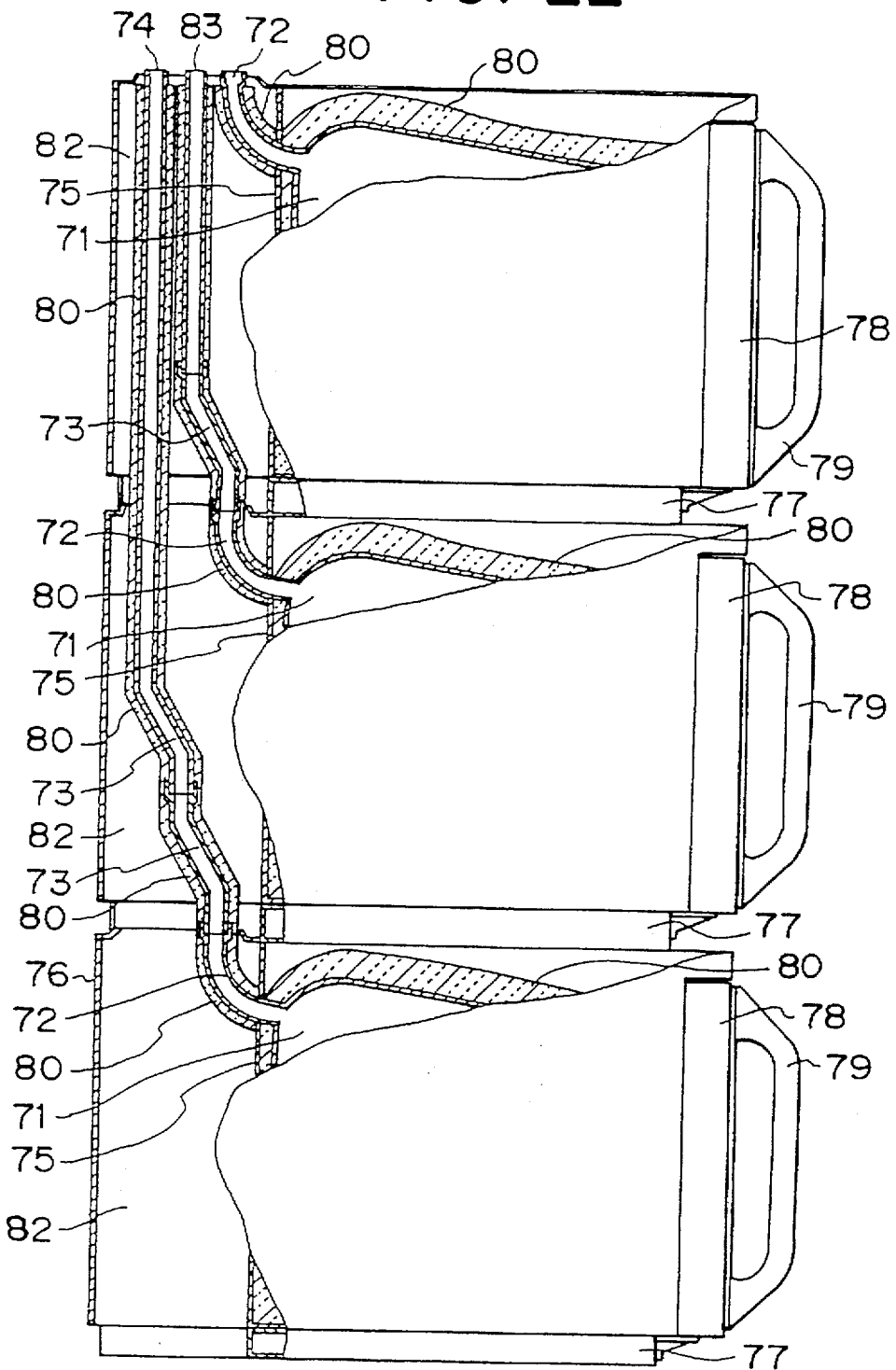
FIG. 22 is a partially cutaway perspective view of the heating apparatus in FIG. 20, in which three such apparatuses are stacked upon one another.
Figure 23:
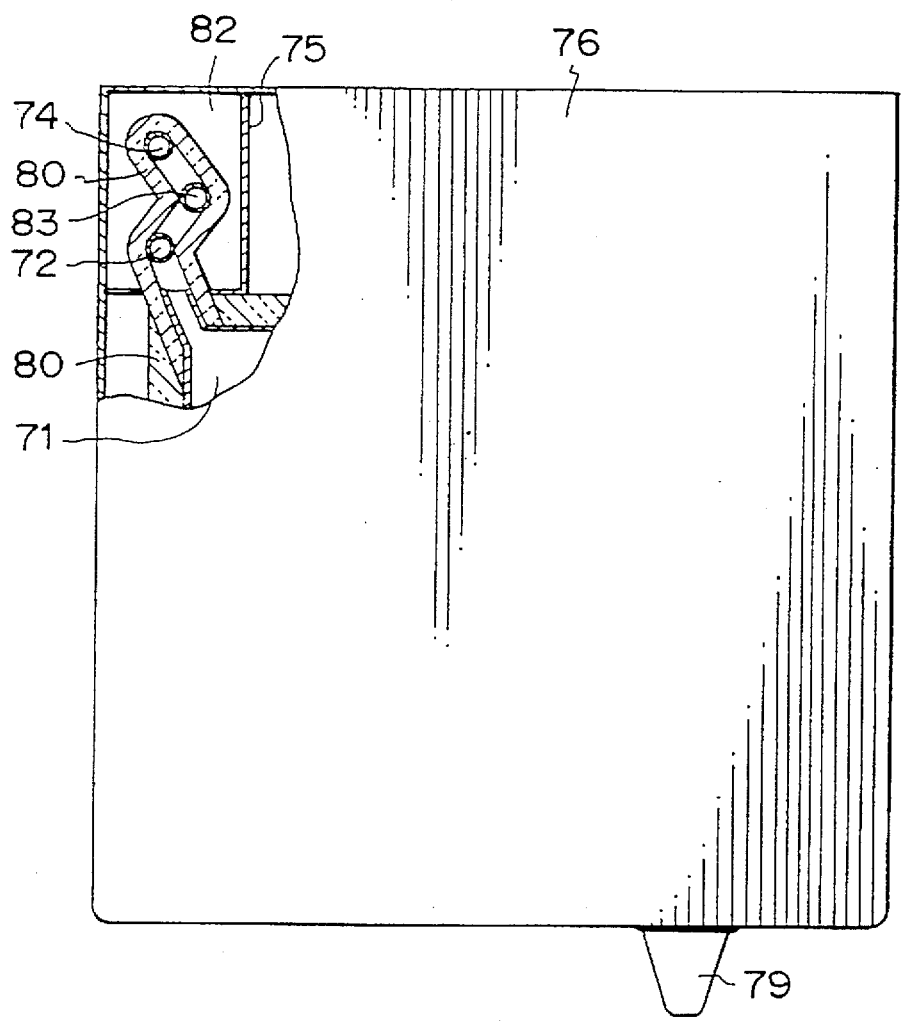
FIG. 23 is a partially cutaway perspective view of the heating apparatus in FIG. 22, in which three such apparatuses are stacked upon one another.

Referring now, in particular, to FIG. 22 and FIG. 23, one example of how the heating apparatus having the above configuration is used will be described below. FIG. 22 is a partially cut away perspective view of the heating apparatus explained in connection with FIGS. 20 and 21, in which three of the above apparatuses are stacked upon one another. FIG. 23 is a partially cut away perspective view of the three heating apparatuses in FIG. 22 stacked upon one another. As is apparent from these FIGS. 22 and 23, by utilizing two S-shaped exhaust connecting pipes 73 and one long liner exhaust connecting pipe 74, the exhaust pipe 72 extended through a heating room 71 of a lower heating apparatus in the stack can be guided to an upper square hole of the sectional chamber 82 of an upper heating apparatus in the stack, via the sectional chamber 82 of a middle heating apparatus in the stack and the sectional chamber 82 of the upper heating apparatus in the stack.

Similar to the above, by utilizing the S-shaped exhaust connecting pipe 73 and a liner exhaust connecting pipe 83, the exhaust pipe 72 connected to the heating room 71 of the middle heating apparatus in the stack can be guided to the upper angular hole of the sectional chamber 82 of the upper heating apparatus through the sectional chamber 82 of the upper heating chamber in the stack. The exterior peripheries of these pipes 73, 74 and 83 also have the insulating material 80 wound thereon. Also, the periphery of the heating room 71 has the insulating material 80 wound thereon.

Thus, in accordance with the heating apparatus of the present invention, even when these three heating apparatuses are stacked upon one another within a projecting plane of these apparatuses, an exhaust operation in the heating room 71 can still be preferably managed. Further, since an upper end portion of the exhaust pipe 72 of the heating apparatus is widened to enlarge the diameter thereof and also an upper end of the exhaust connecting pipe 73 is widened to enlarge the diameter thereof, it is possible to prevent problems such as leakage from the connecting parts between these pipes 72, 73, even when detergent is made to flow from the upper side of the apparatuses to these pipes, at the time of washing the exhaust pipe 72 and the exhaust connecting pipes 73, 74 and 83.

(Turntable Driving Mechanism)

Figure 24:
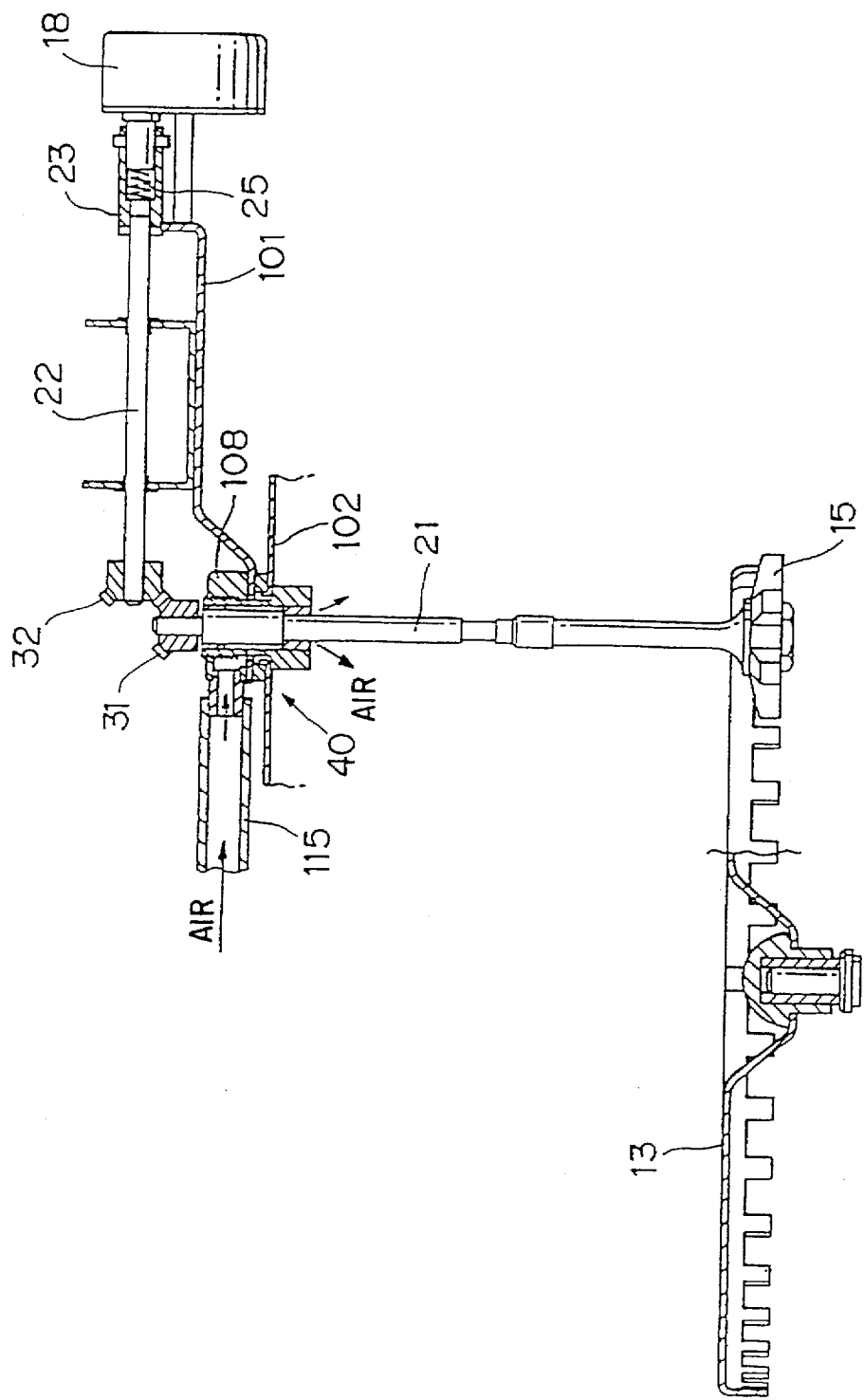
FIG. 24 illustrates only a turntable driving mechanism of the heating apparatus in accordance with one embodiment of the present invention.

For simplification of understanding, FIG. 24 only shows a turntable and a driving mechanism of the turntable relating to the present invention.

Figure 25:
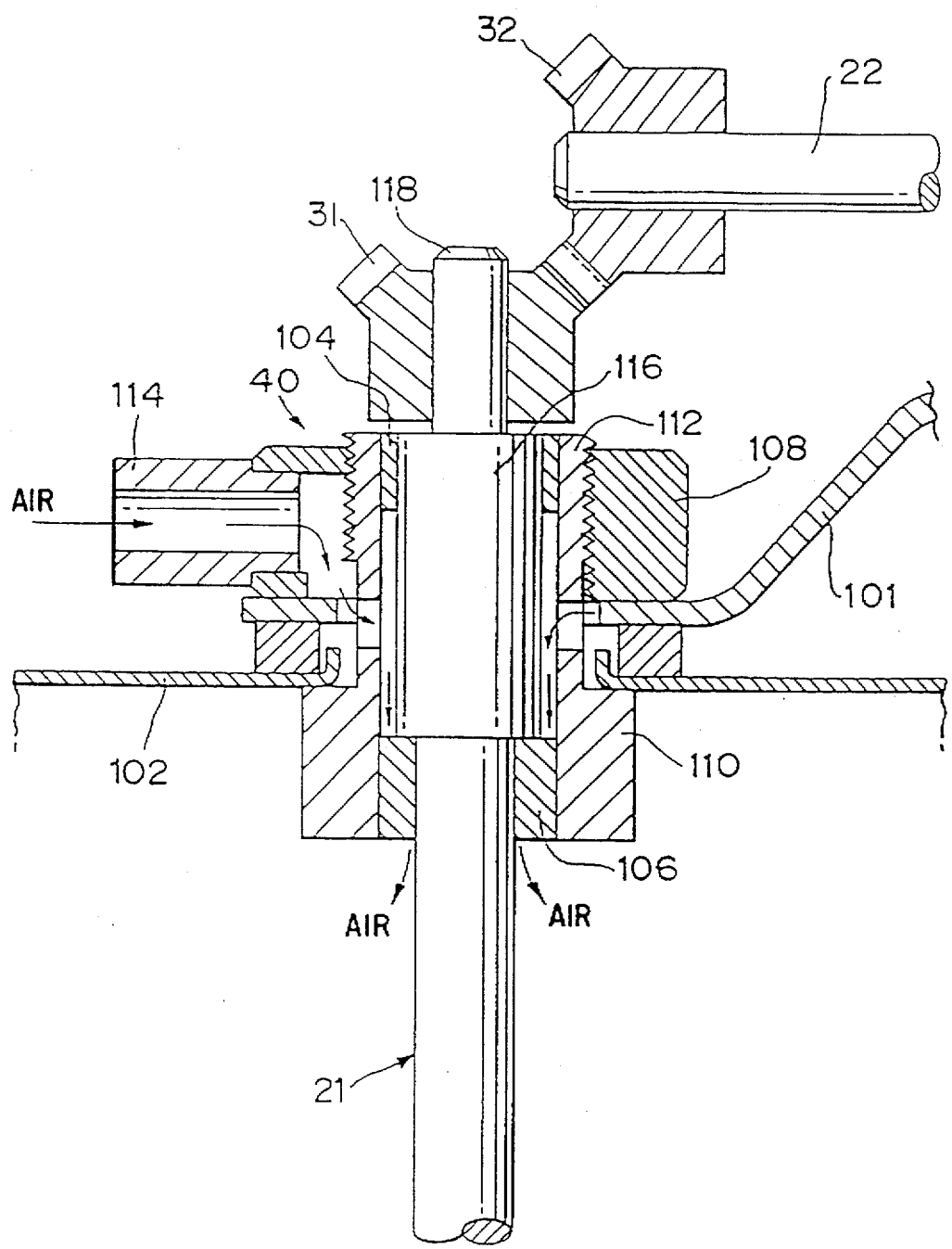
FIG. 25 is a partially enlarged sectional view of the turntable driving mechanism in FIG. 24.

The axis supporter 40 is fixed to an upper board 102 of the heating chamber, to position the connecting shaft 21 at a predetermined place. The upper board 102 is provided with a hole which the connecting shaft 21 penetrates therethrough, and the connecting shaft 21 passes through the penetrating hole, so that it can be rotatably held between the exterior part and the inner part of the heating chamber by utilizing the axis receptor 40. FIG. 25 illustrates an enlarged view of the axis receptor 40 and the connecting shaft 21.

As will be understood from FIG. 25, the connecting shaft 21 has an enlarged area 116 at the upper portion thereof. The left-twisted-spiral miter-gear-wheel 31 is fixed to a projection 118 at the upper portion of the connecting shaft 21 so as to allow the transmission of the rotating torque between the connecting shaft 21 and the left-twisted-spiral-miter gear wheel 31. The connecting shaft 21 is held at the lower portion of the enlarged area 116 of the shaft 21 by utilizing a metal axis supporter 106 which is provided at the lower portion of the axis supporter 40, so as to position the shaft at a predetermined height. The under side surface of the enlarged area 116 is surrounded by a side wall 110 provided on the exterior side of the metal axis receptor 106. There is no gap between the side wall 110 and the upper board 102.

The upper portion of the enlarged area 116 of the connecting shaft 21 is surrounded by a sleeve 112. A shielding member 104, which is rotatably secured to the connecting shaft 21, is provided at the inside of the upper end portion of the sleeve 112. There is a gap between the sleeve 112 except for the upper end portion thereof and the enlarged area 116. The exterior periphery of the sleeve 112 is provided with a nut 108 fastened to the sleeve 112. A board 101 for supporting the connecting shaft 22 is extended to the lower portion of the sleeve 112 to fasten the nut 108 onto the extended portion. There is no gap between the nut 108 and the supporting board 101. The nut 108 sets the sleeve 112 at a predetermined position.

An air introduction opening 114 penetrating the nut 108 is provided to transmit the air pressed by a fan (not shown) from the introduction opening 114 to the inside of the axis receptor 40 via a hose 115. Only such a fan is provided for the above use, however, it is possible to also use for the above use a fan for cooling components such as a magnetron. In other words, since the amount of the air available for the above use is very small, it is possible to introduce a part of the air generated by the fan, which is provided for cooling the components such as a magnetron, into the air introduction opening 114.

There is a relatively large gap between the axis receptor 40 and the enlarged area 116 of the connecting shaft 21 to make it easy to enter the air which is introduced from the air introduction opening 114 into the gap. The air introduced into the relatively large gap is then guided to a lower part thereof along a lower part of the enlarged area 116 and the side surface of the enlarged area 116, and finally made to flow into the inside of the heating chamber 1.

Effect of the Invention

In accordance with the turntable mechanism of the present invention, since the turntable is supported at the central portion thereof and is rotated at the periphery thereof by the turntable driving gear-wheel, the turntable can be preferably rotated even when a food product is mounted close to the turntable periphery to cause the turntable to be eccentrically overloaded. In addition, since the turntable is provided with a concave at the central portion thereof and further the concave is provided with openings, hot air heating and microwave heating of the bottom of food product to be heated which is mounted on the central portion of the turntable can be effectively accomplished via the openings.

Further, since there is no rotating axis which penetrates the under side of the heating chamber to transmit the rotating torque therethrough, the cleaning operation utilizing water, detergent and so on, is made easier.

The torque limiter mechanism of the present invention is provided with a limiter mechanism, which can also be used in a small heating apparatus, comprising a turntable that can hardly detect electric signals, because the present apparatus utilizes only a mechanical operation to detect and remove overloading, rather than detection of the electric signals to detect the overloading.

In accordance with the jet impingement technique of the present invention, the supplying of heated air is made uniform, since some slopes are provided on parts of the ceiling and bottom surfaces of the wall surfaces of the heating chamber, the slopes guiding the heated air to the jet impingement ejectors. As a result, even if a jet impingement technique is utilized, it is possible to achieve more uniform and effective air heating, thereby making the baking operation of the food product more uniform and effective. Further, the structure of the present invention is simplified, since part of the air passage to the jet ejectors is also commonly used as one part of the heating chamber.

Further, since some of the components within the heating chamber can be removed therefrom, improvement of cleaning performance can be achieved. Also, an automatic cleaning operation can be improved, since the water can be reserved in the recess formed by the scarfed area at the bottom of the heating chamber.

The fan guard of the present invention is arranged to prohibit the fan and the heater from being activated, when the fan guard is still not firmly secured to the front face of the fan. Thus, accidents to the hands, fingers and so on, can be avoided, which accidents may occur due to the fan rotating at a high speed and the heater being heated, under undesirable circumstance, to nearly 300° C. and contaminants being generated in the inside of the heating apparatus.

In accordance with the heating apparatus comprising the exhaust tube of the present invention, it is possible to attach the apparatus near a wall surface, since exhaust tubes can be easily connected together within the heating apparatuses even when stacking the heating appratuses one upon another. Further, it is easy to clean the exhaust tube itself, and also no additional components for heat shielding are required.

In accordance with the turntable driving mechanism of the present invention, it is possible to effectively prevent contaminants and so on, from flowing into the gap between the connecting shaft 5 and the axis receptor 40, since it is possible for a small amount of air to always flow from the outside to the inside of the heating apparatus via the gap between the connecting shaft 5 and the axis receptor 40, thereby eliminating obstacles which might hinder the rotation of the connecting shaft.

What is claimed is:

1. A fan guard removably fixed to an inside of a heating chamber, in front of a means for generating heated air which is to be transmitted into the inside of the heating chamber, comprising:

a switch activation means for activating a means, positioned at an outside of the heating chamber, for allowing generation of the heated air when said fan guard is fixed to the heating chamber, said switch activation means constituting a part of a means for fixing the fan guard to the heating chamber, said switch activation means being adapted to be engaged with an attachment place provided on a corresponding position on a wall surface of the heating chamber, said means for allowing generation of the heated air being disposed at a position at the outside of the heating chamber corresponding to said corresponding position of said attachment place.

2. The fan guard according to claim 1, wherein said switch activation means comprises a magnet, and said means for allowing generation of the heated air is a magnet closing switch.

3. The fan guard according to claim 2, and further comprising a means for cooling an area around said magnet closing switch.

* * * * *